US009426819B2

(12) United States Patent
Nagata et al.

(10) Patent No.: US 9,426,819 B2
(45) Date of Patent: Aug. 23, 2016

(54) RADIO COMMUNICATION SYSTEM, RADIO BASE STATION APPARATUS, USER TERMINAL AND COMMUNICATION CONTROL METHOD

(71) Applicant: NTT DOCOMO, INC., Tokyo (JP)

(72) Inventors: Satoshi Nagata, Tokyo (JP); Mingju Li, Beijing (CN); Xiang Yun, Beijing (CN); Lan Chen, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 2 days.

(21) Appl. No.: 14/410,997

(22) PCT Filed: Jun. 24, 2013

(86) PCT No.: PCT/JP2013/067238
§ 371 (c)(1),
(2) Date: Dec. 23, 2014

(87) PCT Pub. No.: WO2014/002944
PCT Pub. Date: Jan. 3, 2014

(65) Prior Publication Data
US 2015/0341949 A1 Nov. 26, 2015

(30) Foreign Application Priority Data
Jun. 26, 2012 (JP) ................. 2012-143501

(51) Int. Cl.
*H04L 1/00* (2006.01)
*H04W 72/12* (2009.01)
(Continued)

(52) U.S. Cl.
CPC ........... *H04W 72/1252* (2013.01); *H04B 7/024* (2013.01); *H04L 1/0067* (2013.01);
(Continued)

(58) Field of Classification Search
CPC ..... H04W 72/04; H04W 72/05; H04W 72/06;
H04W 80/04; H04W 80/05; H04W 80/06;
H04W 80/07; H04W 80/08; H04W 84/08;
H04W 84/09; H04W 84/10
USPC .................... 370/230, 235, 229, 328, 329, 34
See application file for complete search history.

(56) References Cited

U.S. PATENT DOCUMENTS

2015/0117291 A1* 4/2015 Seo .................... H04L 5/001
370/312

OTHER PUBLICATIONS

International Search Report issued in PCT/JP2013/067238 mailed on Sep. 17, 2013 (3 pages).

(Continued)

*Primary Examiner* — Dady Chery
(74) *Attorney, Agent, or Firm* — Osha Liang LLP

(57) ABSTRACT

In order to signal information that is required in rate matching efficiently, even when CoMP transmission/reception techniques are employed, CoMP transmission is scheduled, in which a plurality of radio base station apparatuses (eNBs) serve as transmission points and carry out coordinated multi-point transmission with respect to a user terminal (UE), downlink control information is generated, in which a rate matching pattern is incorporated, in a physical downlink control channel, based on a table, in which rate matching patterns that are required are mapped to bit data in association with transmission modes in CoMP transmission, a physical downlink control channel is transmitted and also a physical downlink shared data channel is transmitted, to the user terminal (UE), and in the user terminal (UE), the rate matching pattern incorporated in the downlink control information, is specified, based on a table of the same contents as in the radio base station apparatuses (eNBs).

7 Claims, 20 Drawing Sheets

DYNAMIC POINT SELECTION(DPS)

(51) Int. Cl.
*H04B 7/02* (2006.01)
*H04W 16/28* (2009.01)
*H04L 5/00* (2006.01)

(52) U.S. Cl.
CPC ............ *H04L5/0035* (2013.01); *H04L 5/0053* (2013.01); *H04L 5/0094* (2013.01); *H04L 5/0098* (2013.01); *H04W 16/28* (2013.01); *H04W 72/12* (2013.01); *H04W 72/1289* (2013.01); *H04L 5/0058* (2013.01); *H04L 5/0085* (2013.01); *H04L 5/0087* (2013.01)

(56) References Cited

OTHER PUBLICATIONS

Huawei et al.; "Considerations on DL and UL DCI for CoMP"; 3GPP TSG RAN WG1 Meeting #69, R1-121952; Prague, Czech Republic; May 21-25, 2012 (5 pages).

LG Electronics; "Required Downlink Control signaling for CoMP"; 3GPP TSG RAN WG1 Meeting #68b, R1-121446; Jeju, Korea; Mar. 26-30, 2012 (3 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN); (Release 7)"; Sep. 2006 (57 pages).

Office Action issued in corresponding Japanese Application No. 2012-143501, mailed Mar. 10, 2015 (7 pages).

Office Action issued in corresponding Japanese Application No. 2012-143501, mailed Jun. 2, 2015 (8 pages).

Extended Search Report issued in corresponding European Application No. 13810415.3, mailed Feb. 16, 2016 (8 pages).

Renesas Mobile Europe Ltd.; "Downlink control signaling for CoMP"; 3GPP TSG-RAN WG1 Meeting #68bis, R1-121395; Jeju, Korea; Mar. 26-30, 2012 (4 pages).

* cited by examiner

JOIN TRANSMISSION(JT)

DYNAMIC POINT SELECTION(DPS)

FIG.3A ☐ PDCCH RE ☒ CRS RE ☐ PDSCH RE
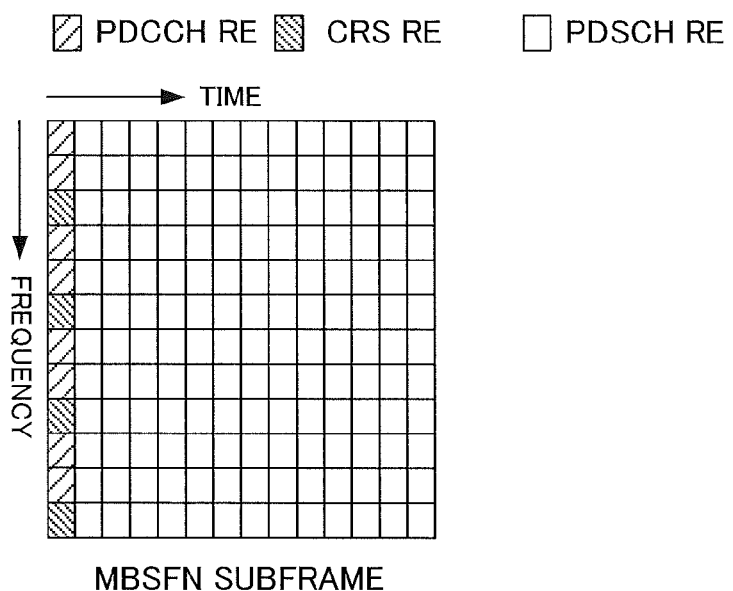
MBSFN SUBFRAME
FIG.3B
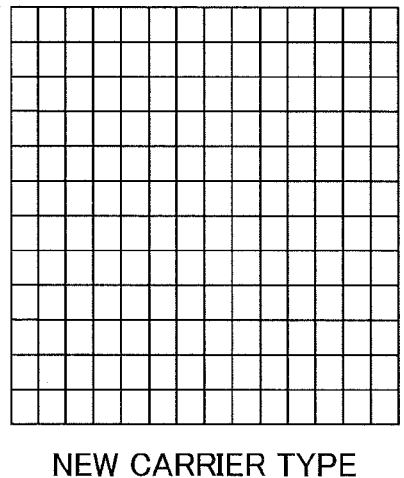
NEW CARRIER TYPE
FIG.3C
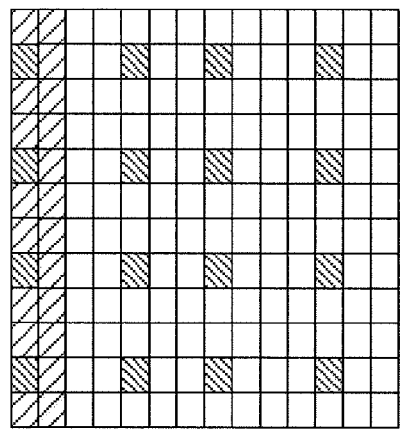
CELL 1 (CELL 1 & CELL2)

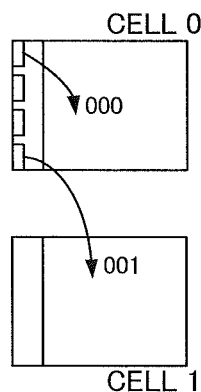
FIG.5A
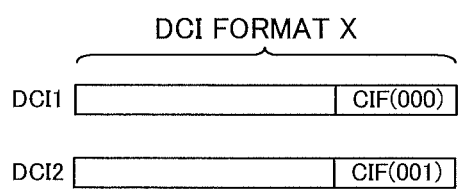
FIG.5B
| CIF BITS | | | CELL INDEX TO BE SCHEDULED |
|---|---|---|---|
| 0 | 0 | 0 | CELL 0 |
| 0 | 0 | 1 | CELL 1 |
| 0 | 1 | 0 | CELL 2 |
| 0 | 1 | 1 | CELL 3 |
FIG.5C

| CIF BITS | RATE MATCHING PATTERN | CoMP TRANSMISSION MODE |
|---|---|---|
| 000 | TP0 | DPS: TP0; JT: TP0&(TP1); TP0&(TP2); TP0&(TP1&TP2) |
| 001 | TP1 | DPS: TP1; JT: TP1&(TP0); TP1&(TP2); TP1&(TP0&TP2) |
| 010 | TP2 | DPS: TP2; JT: TP2&(TP0); TP2&(TP1); TP2&(TP0&TP1) |
| 011 | TP0&TP1 | · JT: TP0&TP1; TP0&TP1&(TP2);<br>· DPS WITH CRS INTERFERENCE REMOVE: TP0; TP1 |
| 100 | TP0&TP2 | · JT: TP0&TP2; TP0&(TP1)&TP2;<br>· DPS WITH CRS INTERFERENCE REMOVE: TP0; TP2 |
| 101 | TP1&TP2 | · JT: TP1&TP2; (TP0)&TP1&TP2;<br>· DPS with CRS INTERFERENCE REMOVE: TP1; TP2 |
| 110 | TP0&TP1&TP2 | · DPS WITH CRS INTERFERENCE REMOVE: TP0; TP1; TP2;<br>· OR JT WITH CRS INTERFERENCE REMOVE: TP0&TP1; TP0&TP2; TP1&TP2;<br>· OR JT: TP0&TP1&TP2 |
| 111 | NON-CRS | DPS: (TP0); (TP1); (TP2). JT: (P0&TP1); (TP0&TP2); (TP1&TP2); (TP0&TP1&TP2) |

FIG.6

| CIF BITS | RATE MATCHING PATTERN | CoMP TRANSMISSION MODE |
|---|---|---|
| 000 | TP0 | DPS: TP0; JT: TP0&(TP1); TP0&(TP2); TP0&(TP1&TP2) |
| 001 | TP1 | DPS: TP1; JT: TP1&(TP0); TP1&(TP2); TP1&(TP0&TP2) |
| 010 | TP2 | DPS: TP2; JT: TP2&(TP0); TP2&(TP1); TP2&(TP0&TP1) |
| 111 | NON-CRS | DPS: TP0; TP1; TP2; JT: (TP0&TP1); (TP0&TP2); (TP1&TP2); (TP0&TP1&TP2) |

FIG.8

| CIF BITS | RATE MATCHING PATTERN | CoMP TRANSMISSION MODE |
|---|---|---|
| 000 | TP0 | ONLY TP0 TRANSMIT DATA TO UE |
| 001 | TP1 | ONLY TP1 TRANSMIT DATA TO UE |
| 010 | TP2 | ONLY TP2 TRANSMIT DATA TO UE |
| 011 | TP0&TP1 | ONLY TP1 OR TP0 TRANSMIT DATA TO UE, RATE MATCHING OF TP0 OR TP1 TO REMOVE CRS INTERFERENCE FROM TP0 OR TP1. |
| 100 | TP0&TP2 | ONLY TP2 OR TP0 TRANSMIT DATA TO UE, RATE MATCHING OF TP0 OR TP2 TO REMOVE CRS INTERFERENCE FROM TP0 OR TP2. |
| 101 | TP1&TP2 | ONLY TP1 OR TP2 TRANSMIT DATA TO UE, RATE MATCHING OF TP2 OR TP1 TO REMOVE CRS INTERFERENCE FROM TP2 OR TP1. |
| 110 | TP0&TP1&TP2 | ONLY TP0 OR TP1 OR TP2 TRANSMIT DATA TO UE. RATE MATCHING OF ALL CELLS TO REMOVE CRS INTERFERENCE |
| 111 | NON-CRS | ONLY TP0 OR TP1 OR TP2 TRANSMIT DATA, AND IT IS MBSFN SUBFRAME OR NEW CARRIER TYPE. |

FIG.9

| CIF BITS | RATE MATCHING PATTERN | CoMP TRANSMISSION MODE |
|---|---|---|
| 000 | TP0 | TP0&(TP1); TP0&(TP2); TP0&(TP1&TP2) |
| 001 | TP1 | TP1&(TP0); TP1&(TP2); TP1&(TP0&TP2) |
| 010 | TP2 | TP2&(TP0); TP2&(TP1); TP2&(TP0&TP1) |
| 011 | TP0&TP1 | TP0&TP1; TP0&TP1&(TP2); |
| 100 | TP0&TP2 | TP0&TP2; TP0&(TP1)&TP2; |
| 101 | TP1&TP2 | TP1&TP2; (TP0)&TP1&TP2 |
| 110 | TP0&TP1&TP2 | • ONLY TP0&TP1 OR TP0&TP2 OR TP1&TP2 TRANSMIT DATA TO UE, RATE MATCHING OF ALL THREE CELLS TO REMOVE CRS INTERFERENCE; • OR TP0&TP1&TP2 TRANSMIT DATA TO UE. |
| 111 | NON-CRS | JT: (TP0&TP1); (TP0&TP2); (TP1&TP2); (TP0&TP1&TP2) |

FIG.10

| CIF BITS | RATE MATCHING PATTERN | CoMP TRANSMISSION MODE |
|---|---|---|
| 000 | TP0 | DPS: TP0; JT: TP0&(TP1). |
| 001 | TP1 | DPS: TP1; JT: TP1&(TP0) |
| 010 | TP0&TP1 | •DPS WITH CRS INTERFERENCE REMOVE: TP0; TP1;<br>•JT: TP0&TP1 |
| 011 | NON-CRS | DPS: (TP0) ; (TP1); JT: (TP0&TP1) |

FIG.11A

| CIF BITS | RATE MATCHING PATTERN | CoMP TRANSMISSION MODE |
|---|---|---|
| 000 | TP0 | DPS: TP0; JT: TP0&(TP1). |
| 001 | TP1 | DPS: TP1; JT: TP1&(TP0) |
| 011 | NON-CRS | DPS: (TP0) ; (TP1) ; JT: (TP0&TP1) |

FIG.11B

| CIF BITS | RATE MATCHING PATTERN | CoMP TRANSMISSION MODE |
|---|---|---|
| 000 | TP0 | ONLY TP0 TRANSMIT DATA TO UE |
| 001 | TP1 | ONLY TP1 TRANSMIT DATA TO UE |
| 010 | TP0&TP1 | ONLY TP0 OR TP1 TRANSMIT DATA TO UE, RATE MATCHING OF TP1 OR TP0 TO REMOVE CRS INTERFERENCE FROM TP1 OR TP0. |
| 011 | NON-CRS | DPS: (TP0) OR (TP1) |

FIG.12A

| CIF BITS | RATE MATCHING PATTERN | CoMP TRANSMISSION MODE |
|---|---|---|
| 000 | TP0 | TP0&(TP1). |
| 001 | TP1 | TP1&(TP0) |
| 010 | TP0&TP1 | (TP0&TP1) |
| 011 | NON-CRS | JT: (TP0&TP1) |

FIG.12B

| | CA (CONVENTIONAL METHOD) | CoMP + CA (PROPOSED METHOD) |
|---|---|---|
| ServCellIndex | • USED TO IDENTIFY A SERVING CELL (i.e. THE PCELL OR AN SCELL).<br>• RANGE: INTEGER (0..4) | • USED TO IDENTIFY A SERVING CELL AND COOPERATING POINT (i.e. THE PCELL OR AN SCELL OR A COOPERATING POINT).<br>• RANGE: INTEGER(0..14 (10 FOR MEAS. SIZE =2) ) (WHEN CoMP MEASUREMENT SIZE = 3 ) |
| SCellIndex | • USED TO IDENTIFY AN SCELL<br>• RANGE: INTEGER (1..4) | • USED TO IDENTIFY AN SCELL OR A COOPERATING POINT<br>• RANGE: INTEGER (1..14 (10)) |
| maxSCell | MAXIMUM NUMBER OF SCELLS<br>4 | MAXIMUM NUMBER OF SCELLS AND COOPERATING POINTS<br>14 (9 FOR MEAS.SIZE =2) |
| maxServCell | MAXIMUM NUMBER OF SERVING CELLS<br>5 | MAXIMUM NUMBER OF SERVING CELLS AND COOPERATING POINTS<br>15 (10 FOR MEAS.SIZE =2) |

FIG.13

| ENHANCED CIF (6 BIT) | RATE MATCHING PATTERN | CoMP TRANSMISSION MODE |
|---|---|---|
| 000-000 | TP0 | DPS: TP0;<br>JT: TP0&(TP1); TP0&(TP2); (TP0&TP1&TP2) |
| 000-001 | TP1 | DPS: TP1;<br>JT: TP1&(TP0); TP1&(TP2); (TP1&TP0&TP2) |
| 000-010 | TP2 | DPS: TP2;<br>JT: TP2&(TP0) TP2&(TP1); (TP2&TP0&TP1) |
| 000-011 | TP0&TP1 | • JT: TP0&TP1; TP0&TP1&(TP2);<br>• DPS WITH CRS INTERFERENCE REMOVE: TP0; TP1 |
| 000-100 | TP0&TP2 | • JT: TP0&TP2; TP0&(TP1)&TP2;<br>• DPS WITH CRS INTERFERENCE REMOVE: TP0; TP2 |
| 000-101 | TP1&TP2 | • JT: TP1&TP2; (TP0)&TP1&TP2;<br>• DPS WITH CRS INTERFERENCE REMOVE: TP1; TP2 |
| 000-110 | TP0&TP1&TP2 | • DPS WITH CRS INTERFERENCE REMOVE: TP0; TP1; TP2;<br>• OR JT WITH CRS INTERFERENCE REMOVE: TP0&TP1; TP0&TP2; TP1&TP2;<br>• OR JT: TP0&TP1&TP2 |
| 000-111 | NON-CRS | DPS: (TP0); (TP1); (TP2).<br>JT: (TP0&TP1); (TP0&TP2); (TP1&TP2); TP0&TP1&TP2) |

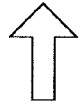

| CA | CIF (3bit) |
|---|---|
| ServCell 0 | 000 |
| ServCell 1 | 001 |
| ServCell 2 | 010 |
| ... | ... |

FIG.15

RADIO COMMUNICATION SYSTEM, RADIO BASE STATION APPARATUS, USER TERMINAL AND COMMUNICATION CONTROL METHOD

TECHNICAL FIELD

The present invention relates to a radio communication system, a radio base station apparatus, a user terminal and a communication control method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band, which ranges from 1.4 MHz to 20 MHz. Also, in the UMTS network, successor systems of the LTE system (referred to as, for example, "LTE-advanced" or "LTE enhancement" (hereinafter referred to as "LTE-A")) are under study for the purpose of achieving further broadbandization and increased speed.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Now, as a promising technique to further improve the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminal UEs (User Equipment) in the frequency domain. Between cells, like in W-CDMA, interference randomization by one-cell frequency re-use is fundamental.

In LTE-A (Rel. 11), studies are in progress to introduce coordinated multi-point transmission/reception (CoMP) techniques as techniques to realize inter-cell orthogonalization. According to these CoMP transmission/reception techniques, a plurality of cells coordinate and perform signal processing for transmission and reception for one user terminal UE or for a plurality of user terminal UEs. By employing these CoMP transmission/reception techniques, improvement of throughput performance is expected, especially with respect to user terminal UEs located on cell edges.

CoMP transmission includes a plurality of transmission modes, such as joint transmission (JT) to transmit a shared data channel from a plurality of cells to one user terminal UE simultaneously, and dynamic point selection (DPS) to transmit data by switching the transmitting cell for a user terminal UE dynamically. In these JT and DPS, a plurality of cells that coordinate and transmit data are referred to as a "CoMP set."

A user terminal UE to receive data that is sent in CoMP transmission needs to carry out rate matching in order to finely adjust the bit rate of the received data. Rate matching here refers to applying an iterative process or a puncturing process to the decoding bits of the transport channel. In this case, in each cell constituting the CoMP set, the arrangement (to be more specific, the number and positions) of resource elements (REs) where a physical downlink shared channel (PDSCH) is allocated varies.

For example, a physical downlink control channel (PDCCH) may be assigned varying numbers of symbols on a per cell basis (one OFDM symbol to three OFDM symbols at the top of a subframe). Consequently, the number of REs where the PDSCH is allocated increases/decreases depending on the number of PDCCH symbols. Also, as for the CRS (Common Reference Signal), the positions of REs, which are set based on cell IDs (cell indices), change. Consequently, the positions of REs where the PDSCH is allocated change depending on the cell IDs of the cells constituting the CoMP set.

To carry out rate matching adequately in a user terminal UE, it is necessary to identify the REs where the PDSCH is allocated (PDSCH allocation region), for every cell that constitutes the CoMP set. Consequently, a radio base station apparatus preferably reports information that is required in rate matching (rate matching information) and that includes information for identifying each cell's PDSCH allocation region, to the user terminal UE. However, rate matching information also changes in accordance with CoMP modes. Consequently, the rate matching information that should be reported to the user terminal UE becomes complex. Furthermore, in CoMP transmission, it is also possible to employ separate CoMP sets in different frequency bands. In this case, the rate matching information that should be reported to the user terminal UE becomes even more complex.

The present invention has been made in view of the above, and it is therefore an object of the present invention to provide a radio communication system, a radio base station apparatus, a user terminal and a communication control method, whereby information that is required in rate matching can be signaled, efficiently, even when CoMP transmission/reception techniques are employed.

Solution to Problem

The radio communication system of the present invention is a radio communication system having a plurality of radio base station apparatuses that each form a cell and a user terminal that connects with each radio base station apparatus via a radio link, and the radio base station apparatus has a scheduler that schedules CoMP transmission, in which the radio base station apparatus serves with other radio base station apparatuses as transmission points and carries out coordinated multi-point transmission for the user terminal, a generating section that generates downlink control information including a rate matching pattern in a physical downlink control channel, based on a table, in which rate matching patterns are mapped to bit data in association with transmission modes in CoMP transmission and a transmission section that transmits the physical downlink control channel and also transmits a physical downlink shared data channel, and the user terminal has a receiving section that receives the physical downlink control channel and also receives the physical downlink shared data channel from all the radio base station apparatuses that carry out CoMP transmission, a detection section that specifies the rate matching pattern included in the downlink control information included in the physical downlink control channel that is received, based on a table of the same content as in the radio base station apparatus, and a rate matching section that carries out rate matching of the downlink shared data channel using the rate matching pattern that is specified.

The radio base station apparatus of the present invention is a radio base station apparatus with which a user terminal connects via a radio link, and has a scheduler that schedules CoMP transmission, in which the radio base station apparatus serves with other radio base station apparatuses as transmission points and carries out coordinated multi-point transmission for the user terminal, a generating section that generates downlink control information including a rate matching pattern in a physical downlink control channel, based on a table, in which rate matching patterns that are required are mapped to bit data in association with transmission modes in CoMP transmission, and a transmission section that transmits the physical downlink control channel and also transmits a physical downlink shared data channel.

The user terminal of the present invention is a user terminal that connects with a plurality of radio base station apparatuses that each form a cell, via a radio link, and this user terminal has a receiving section that receives the physical downlink control channel and also receives the physical downlink shared data channel from all radio base station apparatuses that carry out CoMP transmission, a detection section that specifies a rate matching pattern included in downlink control information in the physical downlink control channel that is received, based on a table that is prepared in advance, and a rate matching section that carries out rate matching of the downlink shared data channel using the rate matching pattern that is specified, wherein, in the table, rate matching patterns that are required are mapped to bit data in association with transmission modes in CoMP transmission.

The communication control method of the present invention is a communication control method in a radio communication system having a plurality of radio base station apparatuses that each form a cell and a user terminal that connects with each radio base station apparatus via a radio link, and this communication control method has the steps of scheduling CoMP transmission, in which the plurality of radio base station apparatuses serve as transmission points and carry out coordinated multi-point transmission for the user terminal, generating downlink control information including a rate matching pattern in a physical downlink control channel, based on a table, in which rate matching patterns that are required are mapped to bit data in association with transmission modes in CoMP transmission, transmitting the physical downlink control channel and also transmitting a physical downlink shared data channel, and in the user terminal, specifying the rate matching pattern included in the downlink control information in the physical downlink control channel that is received, based on a table of the same content as in the radio base station apparatuses.

Advantageous Effects of Invention

According to the present invention, it is possible to signal information that is required in rate matching, efficiently, even when CoMP transmission/reception techniques are employed.

BRIEF DESCRIPTION OF DRAWINGS

FIG. 3 provides diagrams to explain the target of rate matching when joint transmission is carried out including an MBSFN or new carrier type cell;

FIG. 5 provides diagrams to explain the concept of cross-carrier scheduling, and DCI formats and a CIF table used therein;

FIG. 6 is a diagram to show an example of a rate matching table when there are three candidate CoMP cells;

FIG. 8 is a is a diagram to show an example of a rate matching table that is generated after scheduling;

FIG. 9 is a diagram to show an example of a rate matching table that is limited to a specific CoMP transmission mode (CoMP transmission (DPS));

FIG. 10 is a diagram to show an example of a rate matching table that is limited to a specific CoMP transmission mode (CoMP transmission (JT));

FIG. 11 provides diagram to show examples of rate matching tables when there are two candidate CoMP cells;

FIG. 12 provides diagrams to show examples of rate matching tables that are limited to specific CoMP transmission modes;

FIG. 13 is a diagram to show an example of control information that is reported by RRC signaling in an environment where CoMP and CA are employed;

FIG. 15 is a diagram to show an example of a rate matching table including enhanced CIFs;

DESCRIPTION OF EMBODIMENTS

Now, an embodiment of the present invention will be described below in detail with reference to the accompanying drawings. First, CoMP transmission/reception techniques that are studied for introduction in LTE-A (Rel. 11) will be described with reference to FIG. 1. FIG. 1 provides diagrams to explain CoMP transmission/reception (coordinated multipoint transmission/reception) techniques.

Figure 1A:
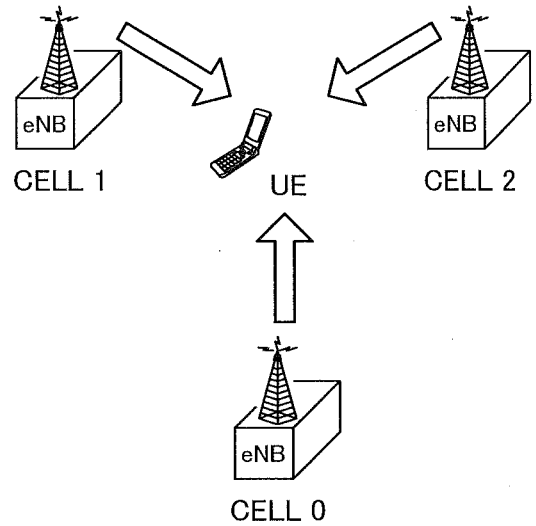
FIG. 1 provides diagrams to explain CoMP transmission/reception (coordinated multi-point transmission/reception) techniques.

FIG. 1A is a conceptual diagram of joint transmission (hereinafter referred to as "CoMP transmission (JT)" when appropriate), which is one kind of CoMP transmission. As shown in FIG. 1A, in joint transmission, in one subframe, the same shared data channel (PDSCH) is transmitted from multiple cells to one user terminal UE simultaneously. The user terminal UE, for example, receives the PDSCH from all transmitting cells including cell 0, cell 1 and cell 2, in one subframe. In this case, the user terminal UE receives the PDSCH that is sent from cell 0, cell 1 and cell 2 in joint transmission, based on the PDCCH that is shared between cell 0, cell 1 and cell 2.

Figure 1B:
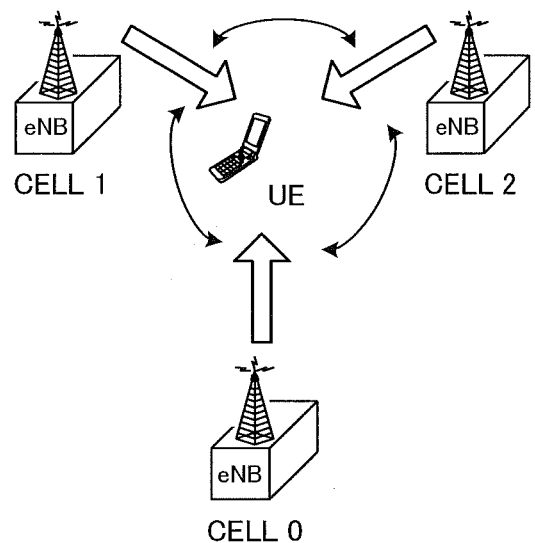

FIG. 1B is a conceptual diagram of DPS (hereinafter referred to as "CoMP transmission (DPS)" when appropriate), which is one kind of CoMP transmission. As shown in FIG. 1B, in DPS, the PDSCH is transmitted by switching the transmitting cell for one user terminal UE dynamically. In this case, the user terminal UE receives PDSCHs that are transmitted separately from cell 0, cell 1 and cell 2, based on PDCCHs that are transmitted separately from cell 0, cell 1 and cell 2.

These CoMP transmission/reception techniques have been proved effective to improve the throughput of user terminals UE located on cell edges. A radio base station apparatus eNB makes a user terminal UE feed back each cell's quality information. Then, the radio base station apparatus eNB determines differences between each cell's quality information (which is, for example, the RSRP (Reference Signal Received Power), the RSRQ (Reference Signal Received Quality) or the SINR (Signal Interference plus Noise Ratio)).

When the differences between the cells in quality information equal or fall below a predetermined threshold value (that is, when there are only insignificant quality differences between the cells), the radio base station apparatus eNB determines that the user terminal UE is located on a cell edge. In this case, the radio base station apparatus eNB employs CoMP transmission. On the other hand, when the differences between the cells in quality information exceed the threshold value (that is, when there are significant quality differences between the cells), the radio base station apparatus eNB determines that the user terminal UE is located near the radio base station apparatus eNB forming one cell and that the user terminal UE is located near the center of a cell of high received quality. In this case, high received quality can be maintained without employing CoMP transmission.

Note that, when CoMP transmission is employed, the user terminal UE feeds back channel state information of each of a plurality of cells to the radio base station apparatus eNB (the radio base station apparatus eNB of the serving cell). On the other hand, when CoMP transmission is not employed, the user terminal UE feeds back the serving cell's channel state information to the radio base station apparatus eNB.

Figures 2A, 2B:
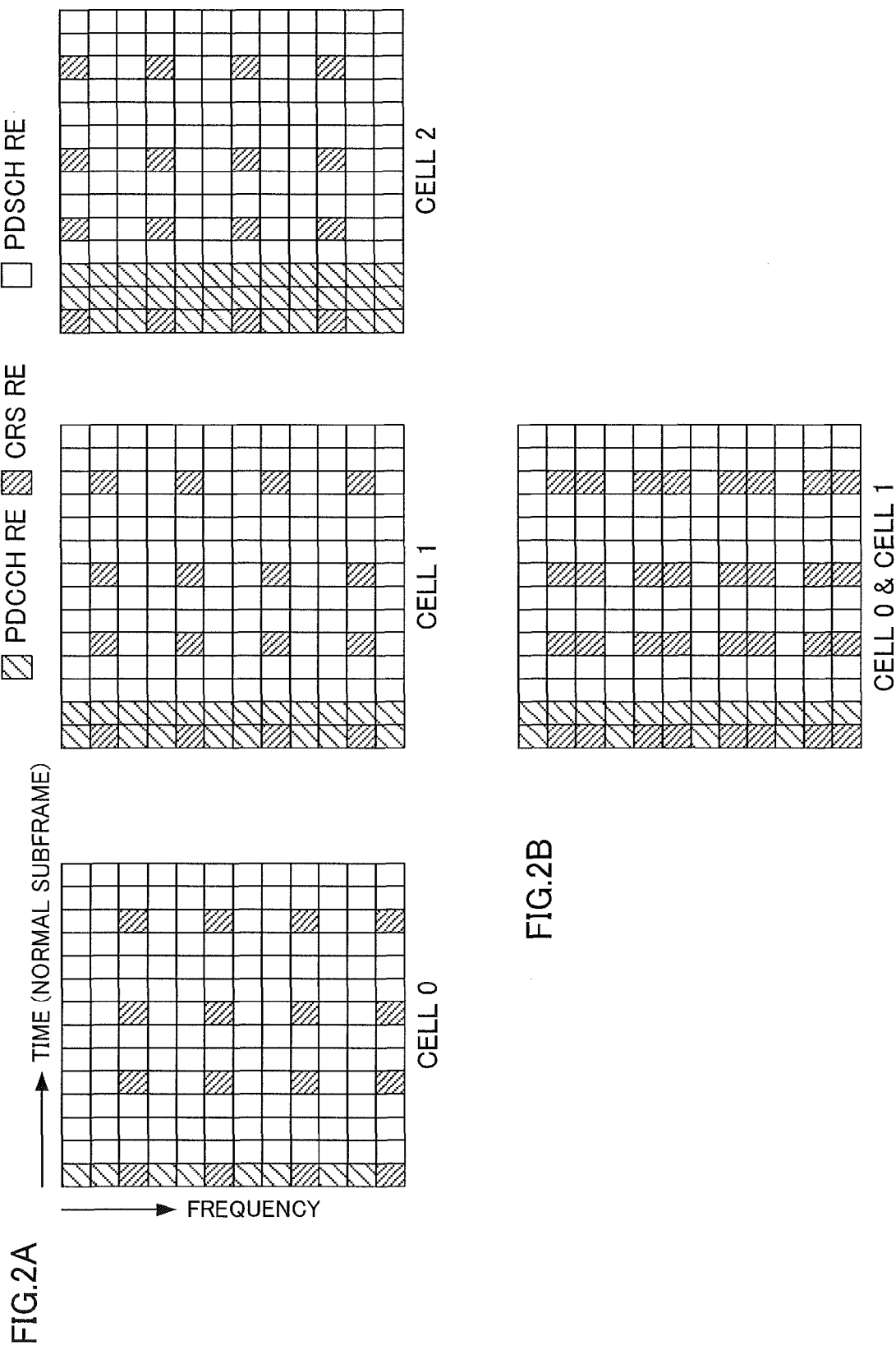
FIG. 2 provides diagrams to explain the target of rate matching when CoMP transmission/reception techniques are employed.

As described above, a user terminal UE to receive data that is sent in CoMP transmission applies rate matching to the received data. Here, the target of rate matching when CoMP transmission/reception techniques are employed will be described with reference to FIG. 2. FIG. 2A shows examples of the frame configurations of the subframes of cells (cell 0 to cell 2) constituting a CoMP set. FIG. 2B shows the target of rate matching when joint transmission is carried out from cell 0 and cell 1 shown in FIG. 2A. Note that, in the subframes shown in FIG. 2, the horizontal axis represents time and the vertical axis represents frequency. The same holds with FIG. 3.

As shown in FIG. 2A, the region where the PDCCH is allocated varies (the PDCCH allocation region) between the subframes of cell 0 to cell 2. In FIG. 2A, a case is illustrated where, as the PDCCH allocation region, the first OFDM (Orthogonal Frequency Division Multiple Access) symbol is allocated in cell 0, the first and second OFDM symbols are allocated in cell 1, and the first to third OFDM symbols are allocated in cell 2. Also, in the subframes of cell 0 to cell 2, the CRSs are allocated to vary REs depending on cell IDs. The PDSCH is allocated to REs where the PDCCH and the CRSs are not allocated in the subframes of cell 0 to cell 2. That is, the PDSCH allocation region varies in every cell that constitutes the CoMP set.

When receiving data from each cell, the user terminal UE carries out rate matching, in which the REs where the PDSCH is allocated in each cell's subframe are the target. For example, when receiving data from cell 0, the user terminal UE carries out rate matching in which REs other than the REs where the PDCCH is allocated (REs of the first OFDM symbol) and the REs where the CRS is allocated are the target. Note that the same applies when receiving data from cell 1 and cell 2.

Here, the PDSCH, which becomes the target of rate matching upon joint transmission from cell 0 and cell 1 to the user terminal UE will be considered. When joint transmission is carried out from cell 0 and cell 1, as shown in FIG. 2B, the PDSCH is allocated to REs where the PDCCH and the CRSs are not allocated in both cells of cell 0 and cell 1. Consequently, the user terminal UE carries out rate matching in which REs other than the REs where the PDCCH is allocated (REs of the first OFDM symbol and second OFDM symbol) and the REs where the CRSs are allocated are the target.

Now, in LTE (Rel. 9), MBMS (Multimedia Broadcast Multicast Service), which is a bearer service that realizes broadcast delivery, is introduced. In this MBMS, an MBSFN (MBMS Single Frequency Network) transmission scheme is supported. This MBSFN transmission scheme is a scheme in which a plurality of radio base station apparatuses eNB that constitute the network transmit the same signal all together in synchronization, so that a user terminal UE is able to perform RF (Radio frequency) coupling of the signals transmitted from each radio base station apparatus eNB.

Also, in the LTE systems of Rel. 11 and later versions, as a frame configuration, a carrier type (new carrier) to provide no conventional PDCCH allocation region in a subframe is under study. In a subframe of this new carrier type, the PDSCH may be allocated to all the REs, without allocating CRSs. Note that a subframe of this new carrier type may be referred to as a subframe of an additional carrier type.

Now, with reference to FIG. 3, the target of rate matching when joint transmission is carried out including a cell where MBSFN or the new carrier type is employed will be described. FIG. 3 provides diagrams to explain the target of rate matching when joint transmission is carried out including an MBSFN or new carrier type cell. In FIG. 3A, the frame configuration of an MBSFN subframe is shown. In FIG. 3B, the frame configuration of a new carrier type subframe is shown. In FIG. 3C, the PDSCH, which is the target of rate matching when joint transmission is carried out including an MBSFN subframe or a new carrier type cell, is shown.

In the MBSFN subframe, as shown in FIG. 3A, maximum two OFDM symbols from the top of the subframe are defined as a PDCCH allocation region. In FIG. 3A, a case is shown where one OFDM symbol is designated as a PDCCH allocation region. Also, in the MBSFN subframe, REs apart from the PDCCH allocation region are defined as a PDSCH allocation region. Furthermore, CRSs are never allocated to this PDSCH allocation region. Consequently, in the MBSFN subframe, it is possible to allocate the PDSCH to all the REs from the second OFDM symbol or the third OFDM symbol onward.

Note that MBSFN subframes may be set selectively in subframes other than subframes #0, #4, #5 and #9, among subframes #0 to #9 constituting the radio frame. That is, the radio base station apparatus eNB can make subframe #1 to #3 and #6 to #8 MBSFN subframes, selectively.

On the other hand, in the new carrier type subframe, as shown in FIG. 3B, no PDCCH allocation region is provided, and therefore no CRSs may be allocated. Consequently, in the new carrier type subframe, it is possible to allocate the PDSCH to all the REs included in the subframes.

Now, assume that these MBSFN subframe and new carrier type subframe are set in cell 2. Then, the PDSCH, which is the target of rate matching when joint transmission is carried out from this cell 2 and cell 1 shown in FIG. 2 to a user terminal UE, will be described. When joint transmission is carried out from cell 1 and cell 2, as shown in FIG. 3C, the PDSCH is allocated to REs where the PDCCH and CRSs are not allocated, in both cell 1 and cell 2. In this case, in the MBSFN subframe and the new carrier type subframe of cell 2, the PDCCH and CRSs are not allocated to the REs of the second and later OFDM symbols. Consequently, the REs where the PDSCH is allocated in the subframe of cell 1 become the target of rate matching.

Now, in LTE-A (Rel. 10), carrier aggregation (CA) is employed as a technique to expand the band by grouping a plurality of component carriers (CCs) of different frequency bands. Also, in LTE-A (Rel. 10), when a plurality of CCs are used in CA, cross-carrier scheduling to carry out scheduling with respect to the PDSCHs of a plurality of CCs (one primary cell+maximum four secondary cells) from the PDCCH of one primary cell is employed. Note that the details of downlink control information to be transmitted by the PDCCH will be defined as a DCI (Downlink Control Information) format.

When cross-carrier scheduling is employed, DCI for a secondary cell PDCCH is allocated to the PDCCH allocation region (radio resources of maximum three OFDM symbols from the top OFDM symbol) in the primary cell. In this case, a CIF (Cell Index Field) to show a cell index is defined in the DCI, in order to identify the PDCCH to receive which cell's PDSCH.

Now, a case where CA is configured in the system configuration (HetNeT) shown in FIG. 4 will be described. In the radio communication system shown in FIG. 4A, a macro cell (cell 0) having a wide coverage area, and a pico cell (cell 1) having a localized coverage area within the coverage area of the macro cell (cell 0) are placed. Note that the pico cell (cell 1) has lower transmission power than the macro cell (cell 0), and therefore may be referred to as a "low power cell." Here, assume that, as shown in FIG. 4B, frequency band 1 is assigned to the macro cell (cell 0), and frequency band 2, which is different from frequency band 1, is assigned to the pico cell (cell 1).

Figure 4A:
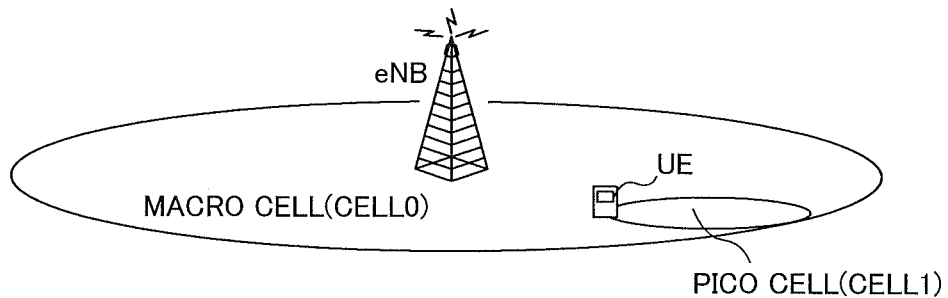
FIG. 4 provides diagrams to explain an example of a system configuration.
Figure 4B:
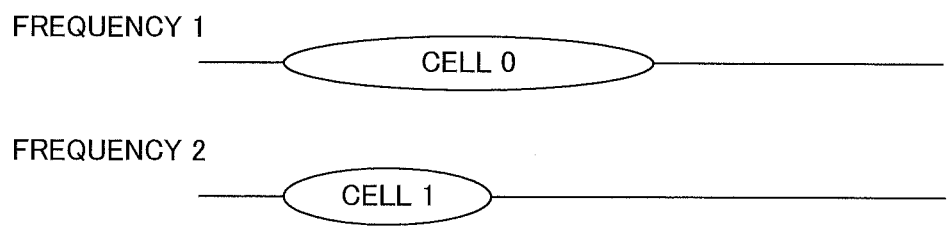

In the system configuration shown in FIG. 4A, first, to establish communication (RRC connection), a user terminal UE reports its own terminal capabilities (UE capabilities) to the radio base station apparatus eNB of the primary cell (Pcell). The radio base station apparatus eNB of the primary cell learns the communication capabilities of the connecting user terminal UE based on the reported terminal capabilities. Here, if the user terminal UE supports CA and communicates using a plurality of CCs, the radio base station apparatus eNB reports control information including the following five pieces of information, by means of RRC (Radio Resource Control) signaling.

secondary cell (Scell) index
    physical cell ID and downlink carrier frequency
    CRS port number
    MBSFN subframe configuration and subframe offset
    PDSCH starting symbol When scheduling with respect to the PDSCHs of multiple cells (cell 0 and cell 1) is carried out from one cell (cell 0) (cross-carrier scheduling), as shown in FIG. 5A, PDCCHs (DCI) for the PDSCHs transmitted from each cell can be transmitted using PDCCH resources for cell 0, which serves as the primary cell.

In cross-carrier scheduling, it is necessary to identify which cells' PDCCHs the PDCCHs (DCI) of multiple cells gathered and transmitted in the primary cell's PDCCH resources are. So, a CIF for identifying to which cell the PDCCH corresponds is added to the DCI of each cell's PDCCH. By this means, the user terminal UE can identify the cell to which a PDCCH corresponds, based on the bit information constituting the CIF.

That is, a common CIF table such as the one shown in FIG. 5C is held in the radio base station apparatus eNB and in the user terminal UE, so that the cells of PDCCHs can be specified based on CIF bit information reported from the radio base station apparatus eNB. FIG. 5B is a conceptual diagram of DCI formats include in the PDCCH, and shows how bit data representing the cells in CA is written in the CIF. Note that, as shown in FIG. 5, three bits are allocated to the CIF.

For example, according to the CIF table shown in FIG. 5C, when the bit information (000) is designated in the CIF included in the DCI of a PDCCH that is received, the user terminal UE can identify this PDCCH as the PDCCH for receiving the PDSCH of cell 0. Meanwhile, when the bit information (001) is designated in the CIF included in DCI of a PDCCH that is received, the user terminal UE can identify this PDCCH as the PDCCH for receiving the PDSCH of cell 1.

As noted earlier, when CoMP transmission/reception techniques are employed, a user terminal UE needs to carry out rate matching in order to adjust the bit rate of received data finely. Consequently, the radio base station apparatus eNB preferably reports information that is required in rate matching (rate matching information). However, no provision has been made regarding the reporting of rate matching information to user terminals UE. The present inventors have focused on the fact that it is possible to report rate matching information to user terminals UE by using DCI that is defined in the PDCCH, even when CoMP transmission/reception techniques are employed, and arrived at the present invention.

That is, a gist of the present invention is that, when CoMP transmission/reception techniques are employed, a radio base station apparatus eNB generates DCI in which a rate matching pattern is incorporated in the PDCCH, based on a rate matching table, in which rate matching patterns that are required are mapped to bit data in association with CoMP transmission modes, and transmits this PDCCH and also transmits the PDSCH, and a user terminal UE specifies the rate matching pattern that is incorporated in the DCI based on a rate matching table of the same contents as that of the radio base station apparatus eNB.

According to the present invention, a PDCCH to include DCI, which incorporates a rate matching pattern corresponding to a CoMP transmission mode, is transmitted to a user terminal UE. Then, the rate matching pattern incorporated in the DCI is specified based on a rate matching table of the same contents as that of a radio base station apparatus eNB. Consequently, it becomes possible to signal information that is required in rate matching, efficiently, even when CoMP transmission/reception techniques are employed.

Now, a radio communication system according to the present embodiment will be described in detail. In the system configuration shown in FIG. 1, first, to establish a control channel (RRC connection), a user terminal UE reports its own terminal capabilities (UE capabilities) to the radio base station apparatus eNB of the primary cell (the serving cell, which is cell 0). Also, the user terminal UE fees back channel quality information (CQI: Channel Quality Indicator) that is generated, to the radio base station apparatus eNB.

The radio base station apparatus eNB learns the communication capabilities of the connecting user terminal UE based on the reported terminal capabilities. When the user terminal UE supports CoMP transmission/reception, the radio base station apparatus eNB reports candidate measurement cells to the user terminal UE through an RRC (Radio Resource Control) protocol control signal. In the event of the system configuration shown in FIG. 1, three cells—namely, cell 0 to cell 2—are reported as candidate measurement cells. The user terminal UE measures each candidate measurement cell's RSRP and so on, and reports a measurement report result to the radio base station apparatus eNB through higher layer signaling (for example, RRC signaling).

The radio base station apparatus eNB determines candidate CoMP cells from the candidate measurement cells based on the measurement report result. These candidate CoMP cells include a CoMP set, which represents the combination of independent coordinated cells that serve as transmission points (TPs) in CoMP transmission (DPS) and multiple cells that serve as transmission points (TP) in CoMP joint transmission (JT). Then, the radio base station apparatus eNB generates a rate matching table, in which individual coordinated cells (including the serving cell) in the COMP candidate cells and rate matching information corresponding to CoMP sets are associated with the bit information constituting the CIFs.

In this rate matching table, the rate matching information is written in the form of rate matching patterns. Note that this rate matching table is signaled to the user terminal UE by, for example, RRC signaling. By this means, the rate matching table is shared between the radio base station apparatus eNB and the user terminal UE. Note that the signaling from the radio base station apparatus eNB to the user terminal UE is by no means limited to RRC signaling. For example, broadcast signals (such as master information blocks (MIBs) that are transmitted using a physical broadcast channel, system information blocks (SIBs) that are multiplexed on a data channel, and so on) may be sent, or MAC (Medium Access Control) signals may be sent. Also, the transmission may be carried out using the PDCCH.

Here, an example of a rate matching table when there are three candidate CoMP cells (cell 0 to cell 2) will be described. FIG. 6 is a diagram to show an example of a rate matching table when there are three candidate CoMP cells. In the rate matching table shown in FIG. 6, rate matching patterns, which are provided as rate matching information, and CoMP transmission modes are registered in association with the bit information constituting the CIFs. Note that, regarding the CoMP transmission modes, the transmission points (TP) to transmit the PDSCH using an MBSFN subframe or a new carrier type subframe when joint transmission is selected are shown in parentheses.

The rate matching patterns shown in FIG. 6 (hereinafter abbreviated as "patterns" when appropriate) will be described with reference to FIG. 2 and FIG. 3. Assume here that the subframes of cell 0 to cell 2, which are candidate CoMP cells, have the frame configurations shown in FIG. 2. The pattern "TP 0" is a pattern to make the PDSCH allocation region of cell 0 shown in FIG. 2 the target of rate matching. Similarly, the patterns "TP 1" and "TP 2" are patterns to make the PDSCH allocation regions of cell 1 and cell 2 shown in FIG. 2 the target of rate matching.

Also, the pattern "TP 0&TP 1" is a pattern to make the PDSCH allocation region shown in FIG. 2B the target of rate matching. That is, in both cells of cell 0 and cell 1, resources where the PDCCH and CRSs are not allocated are made the target of rate matching. Similarly, the pattern "TP 0&TP 2" is a pattern to make resources where the PDCCH and CRSs are not allocated in both cells of cell 0 and cell 2 the target of rate matching. The pattern "TP 1&TP 2" is a pattern to make resources where the PDCCH and CRSs are not allocated in both cells of cell 1 and cell 2 the target of rate matching.

Furthermore, the pattern "TP 0&TP 1&TP 2" is a pattern to make resources where the PDCCH and CRSs are not allocated in all of cell 0, cell 1 and cell 2 the target of rate matching. The pattern "Non-CRS" is a pattern to make the PDSCH allocation regions shown in FIG. 3A or FIG. 3B the target of rate matching. That is, in either cell of the MBSFN or new carrier type, resources where no PDCCH is allocated are made the target of rate matching.

In the rate matching table shown in FIG. 6, the patterns "TP 0," "TP 1" and "TP 2" are associated with the bit information (000), (001) and (010) that constitute the CIFs. Also, the patterns "TP 0&TP 1," "TP 0&TP 2" and "TP 1&TP 2" are associated with the bit information (011), (100) and (101) that constitute the CIFs. Furthermore, the patterns "TP 0&TP 1&TP 2" and "Non-CRS" are associated with the bit information (110) and (111) that constitute the CIFs.

The pattern "TP 0" is selected when CoMP transmission (DPS) is employed and the PDSCH is transmitted from cell 0 (TP 0) alone. On the other hand, when CoMP transmission (JT) is employed and the PDSCH is transmitted from cell 0 (TP 0) and cell 1 (TP 1), the pattern "TP 0" is selected if an MBSFN subframe or a new carrier type subframe is transmitted from cell 1 (TP 1). Similarly, when the PDSCH is transmitted from cell 0 (TP 0) and cell 2 (TP 2), the pattern "TP 0" is selected if an MBSFN subframe or a new carrier type subframe is transmitted form cell 2 (TP 2). Furthermore, when the PDSCH is transmitted from cell 0 (TP 0), cell 1 (TP 1) and cell 2 (TP 2) and an MBSFN subframe or a new carrier type subframe is transmitted from cell 1 (TP 1) and cell 2 (TP 2), the pattern "TP 0" is selected. The same holds with the patterns "TP 1" and "TP 2."

The pattern "TP 0&TP 1" is selected when CoMP transmission (JT) is employed and the PDSCH is transmitted from cell 0 (TP 0) and cell 1 (TP 1). Also, when CoMP transmission (JT) is employed, the pattern "TP 0&TP 1" is selected if the PDSCH is transmitted from cell 0 (TP 0), cell 1 (TP 1) and cell 2 (TP 2) and an MBSFN subframe or a new carrier type subframe is transmitted from cell 2 (TP 2). Meanwhile, when CoMP transmission (DPS) is employed, the pattern "TP 0&TP 1" is selected if the PDSCH is transmitted from cell 0 (TP 0) while interference by the CRS of cell 1 (TP 1) is cancelled. By contrast with this, the pattern "TP 0&TP 1" is selected if the PDSCH is transmitted from cell 1 (TP 1) while interference by the CRS of cell 0 (TP 0) is cancelled. The same holds with the patterns "TP 0&TP 2" and "TP 1&TP 2."

When CoMP transmission (DPS) is employed, the pattern "TP 0&TP 1&TP 2" is selected if the PDSCH is transmitted from cell 0 (TP 0) while interference by the CRSs of cell 1 (TP 1) and cell 2 (TP 2) is cancelled. Similarly, the pattern "TP 0&TP 1&TP 2" is selected when the PDSCH is transmitted from cell 1 (TP 1) while interference by the CRSs of cell 0 (TP 0) and cell 2 (TP 2) is cancelled, or when the PDSCH is transmitted from cell 2 (TP 2) while interference by the CRSs of cell 0 (TP 0) and cell 1 (TP 1) is cancelled.

On the other hand, when CoMP transmission (JT) is employed, the pattern "TP 0&TP 1&TP 2" is selected if the PDSCH is transmitted from cell 0 (TP 0) and cell 1 (TP 1) while interference by the CRS of cell 2 (TP 2) is cancelled. Similarly, the pattern "TP 0&TP 1&TP 2" is selected when the PDSCH is transmitted from cell 0 (TP 0) and cell 2 (TP 2) while interference by the CRS of cell 1 (TP 1) is cancelled, or when the PDSCH is transmitted from cell 1 (TP 1) and cell 2 (TP 2) while interference by the CRS of cell 0 (TP 0) is cancelled. Also, the pattern "TP 0&TP 1&TP 2" is selected when CoMP transmission (JT) is employed and the PDSCH is transmitted from cell 0 (TP 0), cell 1 (TP 1) and cell 2 (TP 2).

The pattern "Non-CRS" is selected when CoMP transmission (DPS) is employed and the PDSCH is transmitted in an MBSFN subframe or a new carrier type subframe from cell 0 (TP 0) alone. Similarly, the pattern "Non-CRS" is selected when the PDSCH is transmitted in an MBSFN subframe or a new carrier type subframe from cell 1 (TP 1) or cell 2 (TP 2) alone. On the other hand, when CoMP transmission (JT) is employed, the pattern "Non-CRS" is selected if the PDSCH is transmitted in in an MBSFN subframe or a new carrier type subframe from cell 0 (TP 0) and cell 1 (TP 1) alone. Similarly, the pattern "Non-CRS" is selected when the PDSCH is transmitted in an MBSFN subframe or a new carrier type subframe from cell 0 (TP 0) and cell 2 (TP 2), cell 1 (TP 1) and cell 2 (TP 2), or cell 0 (TP 0), cell 1 (TP 1) and cell 2 (TP 2).

Figure 7:
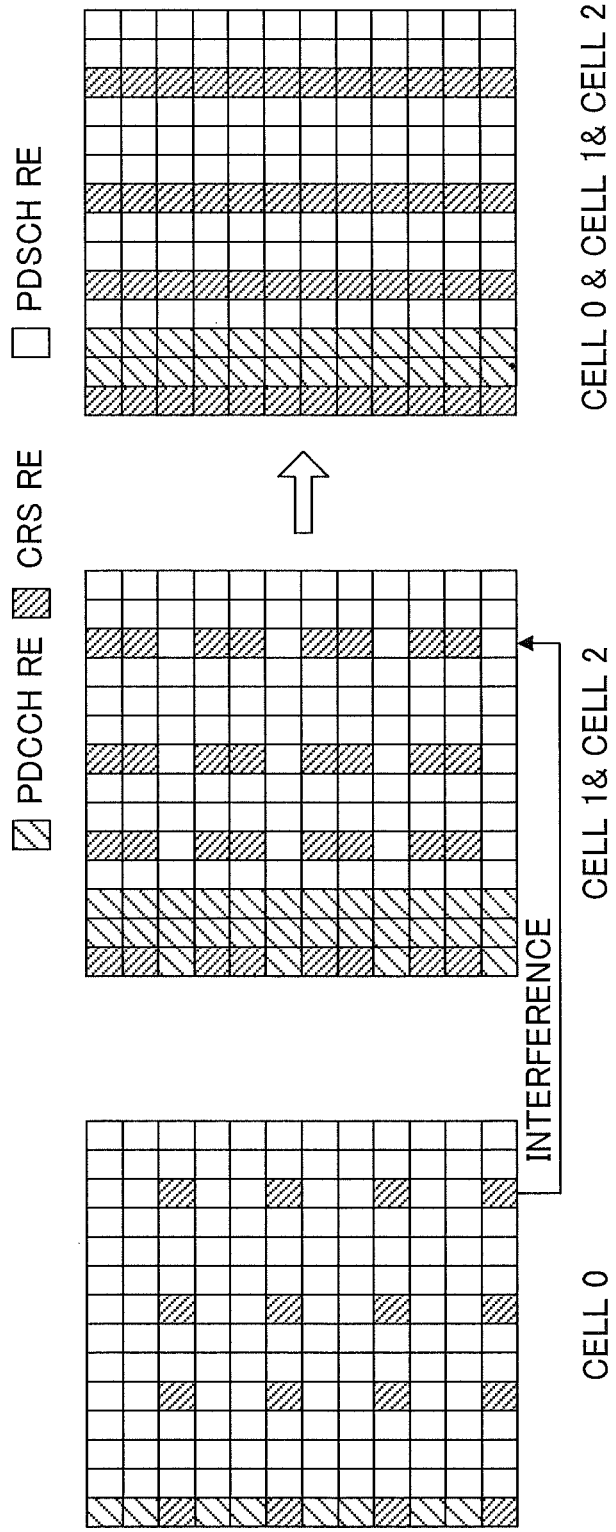
FIG. 7 is a diagram to show examples of frame configurations when, while interference by the CRS of a specific cell is cancelled, the PDSCH is transmitted from another coordinated cell.

Now, the frame configuration when, while interference by the CRS of a specific cell is cancelled, the PDSCH is transmitted from another coordinated cell. FIG. 7 is a diagram to explain a frame configuration when the PDSCH is sent in joint transmission from cell 1 (TP 1) and cell 2 (TP 2) while interference the CRS of cell 0 (TP 0) is cancelled. Note that the subframes of cell 0 (TP 0) to cell 2 (TP 2) shown in FIG. 7 are normal subframes.

As shown in FIG. 7, when joint transmission is carried out from cell 1 (TP 1) and cell 2 (TP 2), the CRS of cell 0 (TP 0) is interference against the PDSCH allocated to the same REs in subframes that are sent in joint transmission. This interference is a cause of signal quality deterioration. Consequently, in the rate matching table shown in FIG. 6, the pattern "TP 0&TP 1&TP 2" is selected when a CoMP transmission mode like this is employed. By this means, although the capacity of transmission data becomes smaller, it is still possible to reduce the deterioration of signal quality.

After having reported the rate matching table shown in FIG. 6 to the user terminal UE, the radio base station apparatus eNB carries out scheduling based on CQIs fed back from the user terminal UE. In this case, the radio base station apparatus eNB determines the CoMP transmission cells to transmit the shared data channel to the user terminal UE, based on the CQIs fed back from the user terminal UE. Accompanying this determination of the CoMP transmission cells, the CoMP transmission mode is also specified.

Also, the radio base station apparatus eNB determines whether the subframe of the determined CoMP transmission cell is an MBSFN subframe or a new carrier type subframe. Based on the result of this determination here, the radio base station apparatus eNB selects the rate matching pattern to match the CoMP transmission mode. Then, the radio base station apparatus eNB generates downlink control information (DCI), in which bit information to correspond to the selected rate matching pattern is written in the CIF, in the PDCCH of the cells matching the CoMP transmission mode.

Now, the operations to be carried out when CIFs that are selected in the radio base station apparatus eNB using the rate matching table shown in FIG. 6 are reported to the user terminal UE, while rate matching is carried out in the user terminal UE based on the reported CIFs, will be described. Assume here that the user terminal UE recognizes the rate matching table shown in FIG. 6 by the reporting from the radio base station apparatus eNB.

The radio base station apparatus eNB carries out scheduling based on CQIs fed back from the user terminal UE. In this case, the radio base station apparatus eNB selects the CoMP transmission cells to transmit the shared data channel to the user terminal UE from the candidate CoMP cells, based on the CQIs fed back from the user terminal UE. Here, assume that cell 0 (TP 0) and cell 1 (TP 1) are determined as the CoMP transmission cells. That is, joint transmission from cell 0 (TP 0) and cell 1 (TP 1) is selected.

Next, the radio base station apparatus eNB determines whether the subframes of the determined CoMP transmission cells (cell 0 and cell 1) are MBSFN subframes or new carrier type subframes. Here, assume that the subframe of cell 0 (TP 0) is an MBSFN subframe. That is, no CRS is allocated in the subframe of cell 0 (TP 0).

Then, the radio base station apparatus eNB selects the rate matching pattern corresponding to the CoMP transmission mode, and also generates downlink control information (DCI), in which bit information corresponding to that rate matching pattern is written in the CIF. Here, the CoMP transmission mode, in which CoMP transmission (JT) is employed in cell 0 (TP 0) and cell 1 (TP 1) and in which the PDSCH is transmitted from cell 1 (TP 1) in an MBSFN subframe, applies. Consequently, the radio base station apparatus eNB selects the pattern "TP 1" shown in FIG. 6. Then, the radio base station apparatus eNB generates downlink control information (DCI), in which the bit information (001) corresponding to that pattern "TP 1" is written in the CIF. The radio base station apparatus eNB transmits this DCI to the user terminal UE in the PDCCH.

The user terminal UE receives the PDCCH from the radio base station apparatus eNB. Then, the user terminal UE detects the bit information that is designated in the CIF of the DCI included in this PDCCH. Here, upon detecting that the bit information (001) is designated in the CIF of the DCI included in the PDCCH, the user terminal UE acquires the pattern "TP 1" that corresponds to the bit information (001) from the rate matching table. Then, using the pattern "TP 1," the user terminal UE applies rate matching to the data received from the radio base station apparatus eNB.

In this way, with the radio communication system according to the present embodiment, a rate matching table, in which rate matching patterns corresponding to CoMP transmission modes are associated with bit information constituting CIFs, is generated in a radio base station apparatus eNB, and reported to a user terminal UE. Then, the CIF that is associated with the rate matching pattern corresponding to the CoMP transmission mode is selected, and DCI to include that CIF is transmitted to the user terminal UE in the PDCCH. Consequently, the user terminal UE can identify the rate matching information (rate matching pattern) to correspond to the CoMP transmission mode, from the CIF defined in the DCI of the PDCCH. Consequently, it becomes possible to signal information that is required in rate matching, efficiently, even when CoMP transmission/reception techniques are employed.

Note that, according to the above description, a rate matching table that is generated in a radio base station apparatus eNB is transmitted to a user terminal UE and shared, and a PDCCH to include DCI, in which a CIF that is registered in that rate matching table is designated, is transmitted, and, by this means, rate matching patterns that correspond to CoMP transmission modes are signaled. However, with the radio communication system according to the present invention, it is not always necessary to generate a rate matching table in the radio base station apparatus eNB. A shared rate matching table, in which rate matching patterns corresponding to CoMP transmission modes are registered, may be held in advance in the radio base station apparatus eNB and in the user terminal UE. Then, a PDCCH to include DCI, in which a CIF that is registered in that rate matching table is designated, may be transmitted, thereby signaling rate matching patterns that correspond to CoMP transmission modes.

That is, contents pertaining to scheduling CoMP transmission, in which a plurality of radio base station apparatuses eNB serve as transmission points and carry out coordinated multi-point transmission with respect to a user terminal UE, generating DCI, in which a rate matching pattern is incorporated, in a PDCCH, based on a rate matching table, in which rate matching patterns that are required in execution are mapped to bit data in association with transmission modes in CoMP transmission, transmitting this PDCCH with the PDSCH, and, in the user terminal UE, specifying the rate matching pattern that is incorporated in the DCI, based on a rate matching table of the same contents as that of the radio base station apparatus eNB, are covered by the scope of the present invention.

Also, in the above description, the rate matching patterns that are registered in the rate matching table have been described as patterns that determine the target of rate matching based on resources where CRSs are allocated. However, the rate matching patterns are by no means limited to these, and can be changed as appropriate. For example, it is possible to register patterns in which the target of rate matching is determined based on the starting position of the PDSCH. As for the method of reporting such rate matching patterns, a method of following the PCFICH (Physical Control Format Indicator CHannel) that is reported in serving cells, a method of newly adding to DCI, and a method of reporting the PDSCH starting symbol by means of RRC signaling may be possible.

Also, with the radio communication system according to the present embodiment, rate matching patterns that correspond to CoMP transmission modes are signaled using CIFs that are used in cross-carrier scheduling, which is a CA technique. Now, when carrying out rate matching in CoMP transmission/reception techniques, rate matching attributes that are reported by higher layer signaling (for example, RRC signaling) become necessary. Reporting such rate matching attributes in control information that is reported by RRC signaling upon execution of CA constitutes a preferable embodiment.

As described above, when a user terminal UE supports CA, a radio base station apparatus eNB reports control information including the following five pieces of information, by means of RRC signaling:

secondary cell (Scell) index (1 to 4)
    physical cell ID and downlink carrier frequency
    CRS port number
    MBSFN subframe configuration and subframe offset
    PDSCH starting symbol By changing part of these pieces of control information, it is possible to report rate matching attributes that are required when rate matching according to CoMP transmission/reception techniques is executed. For example, the radio base station apparatus eNB reports control information including the following four pieces of information by RRC signaling:

serving cell (Servcell) index (1 or 2)
    physical cell ID and downlink carrier frequency
    CRS port number
    PDSCH starting symbol In this case, the MBSFN subframe configuration and subframe offset are not always necessary. That is, the MBSFN subframe configuration and subframe offset do not influence the execution of rate matching significantly.

In this way, with the radio communication system according to the present embodiment, it is possible to report rate matching attributes to a user terminal UE by changing or removing part of the control information that is reported by RRC signaling upon execution of CA. Consequently, it is possible to report rate matching attributes without significantly changing the RRC signaling content that is reported upon execution of CA. In particular, it is possible to remove the MBSFN subframe configuration and subframe offset, which do not influence the execution of rate matching significantly, from the control information, so that overhead, in which the proportion of control signals with respect to transmission data tends to increase, can be improved.

Note that cases have been shown with the above description where a rate matching table, which is generated before scheduling is carried out based on CQIs fed back from a user terminal UE, is reported by means of RRC signaling. However, the time to generate the rate matching table is not limited to before scheduling, and may come after scheduling is carried out. For example, it is possible to generate the rate matching table shown in FIG. 6 after scheduling is carried out.

Also, when generating the rate matching table after scheduling, it is also possible to generate a rate matching table that takes into account, for example, the result of scheduling, and the result of detecting MBSFN subframes (new carrier type subframes) (hereinafter referred to as the "detection result of MBSFN subframes" and so on). For example, a case will be considered here where, according to the result of scheduling and the detection result of MBSFN subframes and so on, rate matching is required in only one cell (TP). In this case, rate matching patterns for executing rate matching with respect to two or more cells (TPs) are not necessary.

FIG. 8 is a diagram to show an example of a rate matching table that is generated after scheduling. With the rate matching table shown in FIG. 8, the rate matching patterns for rate matching for two or more cells (TPs) are removed from the registration information of the rate matching table shown in FIG. 6. To be more specific, the patterns "TP 0&TP 1," "TP 0&TP 2," "TP 1&TP 2" and "TP 0&TP 1&TP 2" are removed. When rate matching patterns for rate matching for two or more cells (TPs) are removed in this way, it is possible to reduce the amount of information for reporting the rate matching table to the user terminal UE, and therefore achieve improved throughput performance.

Furthermore, when generating the rate matching table after scheduling, it is also possible to generate a rate matching table that is limited to a specific CoMP transmission mode. In this case, for example, a rate matching table that is limited to CoMP transmission (DPS) and a rate matching table that is limited to CoMP transmission (JT) may be generated.

FIG. 9 is a diagram to show an example of a rate matching table that is limited to CoMP transmission (DPS). FIG. 10 is a diagram to show an example of a rate matching table that is limited to CoMP transmission (JT). With the rate matching table shown in FIG. 9, in the registration information in the rate matching table shown in FIG. 6, registration information that relates to joint transmission is removed. Meanwhile, with the rate matching table shown in FIG. 10, in the registration information in the rate matching table shown in FIG. 6, registration information that relates to DPS is removed. In this way, when defining only rate matching patterns that correspond to a specific CoMP transmission mode, it is possible to reduce the amount of information for reporting the rate matching table to a user terminal UE and therefore achieve improved throughput performance.

Furthermore, FIG. 6 shows a rate matching table that is used when there are three candidate CoMP cells. However, the number of candidate CoMP cells is not limited to three, and it is also possible to generate a rate matching table based on two candidate CoMP cells. FIG. 11 is a diagram to show an example of a rate matching table that is used when there are two candidate CoMP cells. Note that FIG. 11A shows an example of a rate matching table that is generated before scheduling, similar to the rate matching table shown in FIG. 6. On the other hand, FIG. 11B shows an example of a rate matching table that is generated after scheduling, similar to the rate matching table shown in FIG. 8.

In the rate matching table shown in FIG. 11A, the patterns "TP 0" and "TP 1" are associated with the bit information (000) and (001) constituting the CIFs. Also, the patterns "TP 0&TP 1" and "Non-CRS" are associated the with the bit information (010) and (011) constituting the CIFs.

When CoMP transmission (DPS) is employed, the pattern "TP 0" is selected if the PDSCH is transmitted from cell 0 (TP 0) alone. Meanwhile, when CoMP transmission (JT) is employed, the pattern "TP 0" is selected if the PDSCH is transmitted from cell 0 (TP 0) and cell 1 (TP 1), and an MBSFN subframe or a new carrier type subframe is transmitted from cell 1 (TP 1). The same holds with the pattern "TP 1."

When CoMP transmission (JT) is employed and the PDSCH is transmitted from cell 0 (TP 0) and cell 1 (TP 1), the pattern "TP 0&TP 1" is selected. Also, when CoMP transmission (DPS) is employed, the pattern "TP 0&TP 1" is selected if the PDSCH is transmitted from cell 0 (TP 0) while interference by the CRS of cell 1 (TP 1) is cancelled. By contrast with this, the pattern "TP 0&TP 1" is selected when the PDSCH is transmitted from cell 1 (TP 1) while interference by the CRS of cell 0 (TP 0) is cancelled.

When CoMP transmission (DPS) is employed and the PDSCH is transmitted in an MBSFN subframe or a new carrier type subframe from cell 0 (TP 0) or cell 1 (TP 1) alone, the pattern "Non-CRS" is selected. On the other hand, when CoMP transmission (JT) is employed, the pattern "Non-CRS" is selected if the PDSCH is transmitted in an MBSFN subframe or a new carrier type subframe from cell 0 (TP 0) and cell 1 (TP 1).

With the rate matching table shown in FIG. 11B, rate matching patterns for rate matching for two or more cells (TPs) are removed from the registration information of the rate matching table shown in FIG. 11A. To be more specific, the pattern "TP 0&TP 1" is removed. In this way, by removing the rate matching patterns for rate matching for two or more cells (TPs), it is possible to reduce the amount of information for reporting the rate matching table to the user terminal UE and therefore achieve improved throughput performance.

Also, when generating a rate matching table after scheduling, it is possible to generate a rate matching table that is limited to a specific CoMP transmission mode, similar to FIG. 9 or FIG. 10. FIG. 12A is a diagram to show an example of a rate matching table that is limited to CoMP transmission (DPS). FIG. 12B is a diagram to show an example of a rate matching table that is limited to CoMP transmission (JT). With the rate matching table shown in FIG. 12A, registration content that relates to joint transmission is removed from the registration information of the rate matching table shown in FIG. 11A. On the other hand, in the rate matching table shown in FIG. 12B, registration content that relates to DPS is removed from the registration information of the rate matching table shown in FIG. 11A. In this way, when defining only rate matching patterns that correspond to a specific CoMP transmission mode, it is possible to reduce the amount of information for reporting the rate matching table to a user terminal UE and therefore achieve improved throughput performance.

With the above radio communication system, rate matching information (rate matching patterns) to correspond to CoMP transmission modes is signaled using CIFs that are used in cross-carrier scheduling, which is a CA technique. That is, rate matching information is signaled using CIFs that are originally provided to show cell indices. Consequently, the above radio communication system is suitable for an environment where CA is not employed and where CoMP alone is employed.

However, in an environment where CoMP and CA are employed, the CIF is used to report cell indices and cannot be used to signal rate matching information. In this environment, reporting rate matching information to a user terminal UE efficiently is preferable from the perspective of improving the overall system throughput performance and signal quality.

In an environment where CoMP and CA are employed, maximum 15 cell indices need to be reported by means of RRC signaling. Consequently, with the radio communication system according to the present embodiment, part of the control information (cell indices) that is included in RRC signaling is changed. FIG. 13 is a diagram to show an example of control information that is reported by RRC signaling in an environment where CoMP and CA are employed. Note that, for ease of explanation, FIG. 13 shows control information that is reported by RRC signaling in an environment where CA alone is employed.

As shown in FIG. 13, control information that is reported by RRC signaling includes the following pieces of information:
  serving cell index (ServCellIndex)
  secondary cell index (SCellIndex)
  maximum value of secondary cells (maxSCell)
  maximum value of serving cells (maxServCell)

In an environment where CA alone is employed, serving cell indices are used to identify the serving cells (for example, the PCell or SCells), and are assigned the values 0 to 4. Secondary cell indices are used to identify the secondary cells, and are assigned the values 1 to 4. Also, the value 4 is set for the maximum value of secondary cells, and the value 5 is set for the maximum value of serving cells.

On the other hand, in an environment where CoMP and CA are applied, serving cell indices are used to identify the serving cells and coordinated points (for example, the PCell or SCells or coordinated points). When the measurement size (candidate measurement cells) is three (two), 0 to 14 (0 to 10) are assigned for these values. Secondary cell indices are used to identify the secondary cells or coordinated points. When the measurement size (candidate measurement cells) is three (two), 1 to 14 (1 to 10) are assigned for these values.

Also, for the maximum value of secondary cells, the maximum value of secondary cells and coordinated points is set. When the measurement size (candidate measurement cells) is three (two), 14 (9) is assigned for this value. For the maximum value of secondary cells, the maximum value of secondary cells and coordinated points is set. When the measurement size (candidate measurement cells) is three (two), 15 (10) is assigned for this value.

That is, in an environment where CoMP and CA are applied, serving cell indices and secondary cell indices are expanded from three bits to four bits. This is to make it possible to identify both serving cells and coordinated points (for example, the PCell or SCells or coordinated points). Accompanying this, the maximum value of secondary cells and the maximum value of serving cells are also changed.

Figure 14:
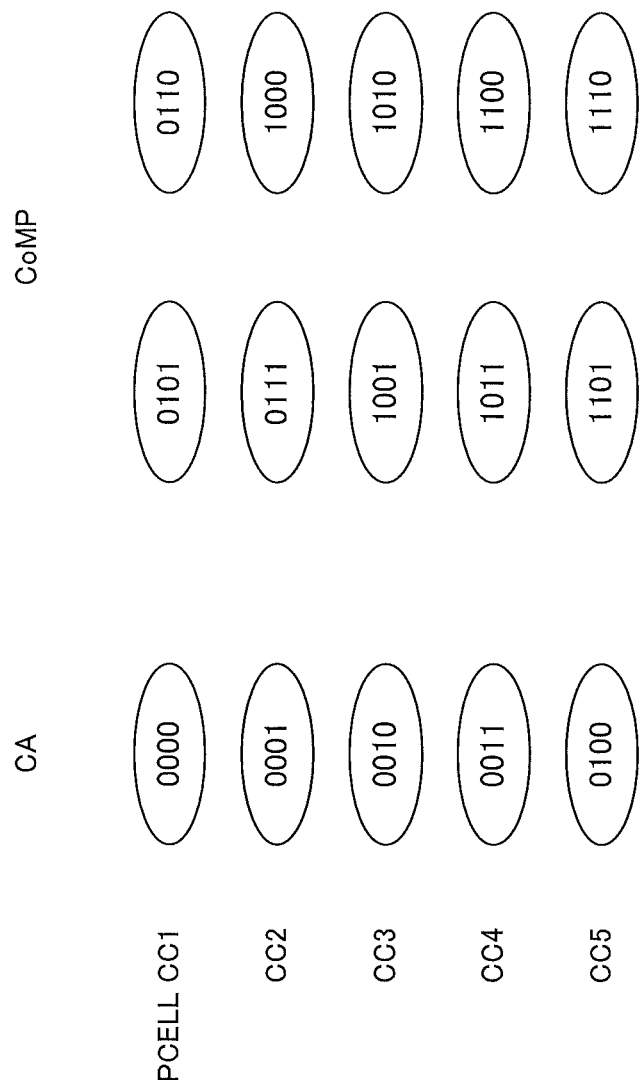
FIG. 14 is a diagram to explain cell indices that are assigned to cells in an environment where CoMP and CA are employed.

FIG. 14 is a diagram to explain the cell indices that are assigned to cells in an environment where CoMP and CA are applied. In FIG. 14, a case is illustrated where coordinated serving cells (CA serving cells) are arranged in the left column, and CoMP coordinated points are arranged in the center and right columns. The values 0 to 4 are assigned to the coordinated serving cells. To be more specific, the bit information (0000), (0001), (0010), (0011) and (0100) are assigned. On the other hand, the values 5 to 14 are assigned to the CoMP coordinated points. To be more specific, the bit information (0101), (0111), (1001), (1011), (1101), (0110), (1000), (1010), (1100) and (1110) are assigned.

In this case, the CC indices are set to the same values as those of the serving cell indices represented by the top three bits of enhanced CIF, which will be described later. In this way, by setting CC indices and serving indices to the same values, these indices can be applied without significantly changing the control information that is used when CA alone is employed. Since the top three bits of the serving cell indices are the same as those of the CC indices, the user terminal UE can learn the CC indices from the serving cell indices.

Regarding a coordinated point that is added new, the coordinated serving cell can be found from the downlink carrier frequency reported by RRC signaling. In an environment where CoMP and CA are employed, when a given secondary cell is added, its downlink carrier frequency is reported from the radio base station apparatus eNB to the user terminal UE (RRC signaling). For example, assume that, after cell 1 (bit information: 0001) is added first, cell 7 (bit information: 0111) is added. In this case, CC 2 is the common CC for both, so that the user terminal UE can identify cell 1 and cell 7 as the same CoMP coordinated cell set.

Also, in an environment where CA is employed, the CIF is used to report cell indices. Consequently, when the CIF is formed with three bits, the CIF cannot be used to signal rate matching information. Consequently, in the radio communication system according to the present embodiment, the number of bits to constitute the CIF is expanded and set to six bits. Note that the number of bits to expand is not limited to three bits and can be changed as appropriate. If necessary, it is also possible to make the number of bits to expand be four bits or more or two bits or less. FIG. 15 is a diagram to show an example of a rate matching table including enhanced CIFs (hereinafter referred to as "enhanced CIFs"). Note that the rate matching table shown in FIG. 15 is only part of the table. Also, in the rate matching table shown in FIG. 15, the registration information of rate matching patterns and CoMP transmission modes are the same as in the rate matching table shown in FIG. 6, and therefore their descriptions will be omitted. Furthermore, in the rate matching table shown in FIG. 15, for ease of explanation, in the enhanced CIFs, hyphens (-) are shown between the bit information of the conventional part and the bit information of the enhanced part.

In the rate matching table shown in FIG. 15, the patterns "TP 0," "TP 1" and "TP 2" are associated with bit the information (000-000), (000-001) and (000-010) constituting the CIFs. Also, the patterns "TP 0&TP 1," "TP 0&TP 2" and "TP 1&TP 2" are associated with the bit information (000-011), (000-100) and (000-101) constituting the CIFs. Furthermore, pattern "TP 0&TP 1&TP 2" and "Non-CRS" are associated with bit information (000-110) and (000-111) constituting the CIFs.

In the bit information constituting the enhanced CIFs, the first-half three bits represent the CC index and the second-half three bits represent the rate matching information (rate matching pattern). In FIG. 15, the bit information (000) to correspond to serving cell 0 is shown. For example, in the enhanced CIF corresponding to serving cell 1, the bit information (001) is designated in the first-half three bits of the enhanced CIF.

In an environment where CoMP and CA are applied, for example, when candidate CoMP cells are determined, a rate matching table such as the one shown in FIG. 15 is generated in the radio base station apparatus eNB. After having reported this rate matching table to the user terminal UE, the radio base station apparatus eNB determines the CoMP transmission cells (CoMP transmission mode) to transmit the shared data channel to the user terminal UE based on CQIs fed back from the user terminal UE.

Also, the radio base station apparatus eNB determines whether or not the subframes of the determined CoMP transmission cells are MBSFN subframes or new carrier type subframes. Based on the result of this determination, the radio base station apparatus eNB selects the rate matching pattern to match the CoMP transmission mode. Then, the radio base station apparatus eNB generates downlink control information (DCI), in which bit information to correspond to the selected rate matching pattern is written in the CIF, in the PDCCH of the cells corresponding to the CoMP transmission mode.

In an environment like this where CoMP and CA are employed, a rate matching table, in which rate matching patterns to correspond to CoMP transmission modes are associated with bit information that constitutes enhanced CIFs is generated in a radio base station apparatus eNB, and reported to a user terminal UE. Then, the enhanced CIF associated with the rate matching pattern to correspond to the CoMP transmission mode is selected, and DCI including that enhanced CIF is reported to the user terminal UE in the PDCCH. Consequently, the user terminal UE can identify the rate matching information (rate matching pattern) that corresponds to the CoMP transmission mode, from the enhanced CIF defined in the DCI of the PDCCH. Consequently, it is possible to signal information that is required in rate matching, efficiently, even when CoMP transmission/reception techniques are employed.

Figure 16:
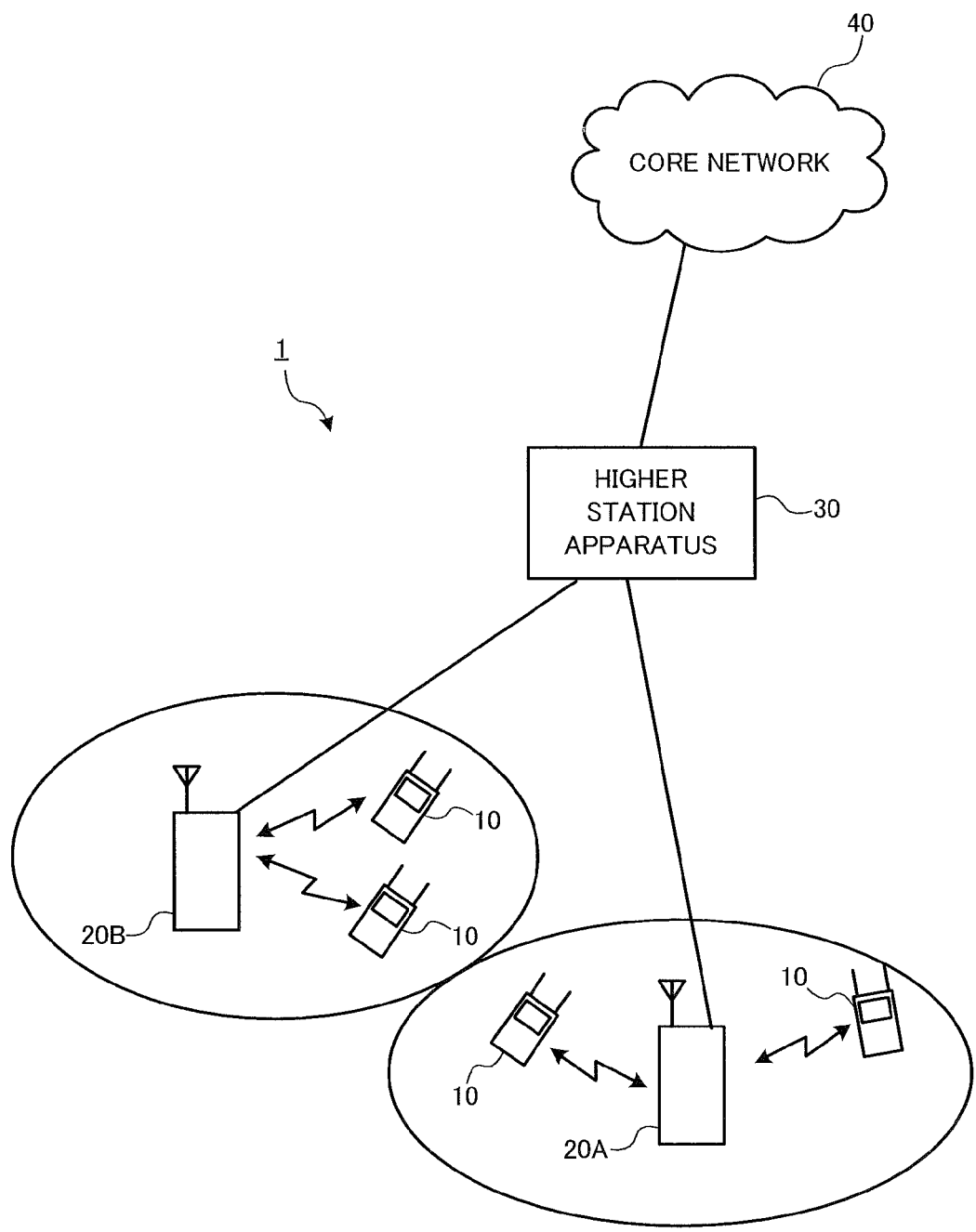
FIG. 16 is a diagram to explain a system configuration of a radio communication system.

Now, a radio communication system according to the present embodiment will be described in detail. FIG. 16 is a diagram to explain a system configuration of the radio communication system according to the present embodiment. Note that the radio communication system shown in FIG. 16 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 16, the radio communication system 1 is formed to include radio base station apparatuses (hereinafter referred to as "base station apparatuses") 20A and 20B that serve as transmission points (TPs), and user terminals 10 that communicate with these base station apparatuses 20A and 20B. The base station apparatuses 20A and 20B are connected with a higher station apparatus 30, and this higher station apparatus 30 is connected with a core network 40. Also, the base station apparatuses 20A and 20B are connected with each other by wire connection or by wireless connection. The user terminals 10 are able to communicate with the base station apparatuses 20A and 20B, which serve as transmission points. Note that the higher station apparatus 30 may be, for example, an access gateway apparatus, a radio network controller (RNC), a mobility management entity (MME) and so on, but is by no means limited to these.

Although the user terminals 10 may include both conventional terminals (Rel. 10 LTE) and support terminals (for example, Rel. 11 LTE), the following description will be given simply with respect to "user terminals," unless specified otherwise. Also, for ease of explanation, the user terminals 10 will be described to perform radio communication with the base station apparatuses 20A and 20B.

In the radio communication system 1, as radio access schemes, OFDMA
(Orthogonal Frequency Division Multiple Access) is applied to the downlink, and SC-FDMA (Single-Carrier Frequency-Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing the system band into bands formed with one resource block or continuous resource blocks, and allowing a plurality of terminals to use mutually different bands.

Here, communication channels will be described. Downlink communication channels include a PDSCH, which is used by the user terminals 10 on a shared basis as a downlink data channel, and downlink L1/L2 control channels (PDCCH, PCFICH, and PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include the PUSCH (Physical Uplink Shared CHannel) that is used by the user terminals 10 on a shared basis as an uplink data channel, and a PUCCH (Physical Uplink Control CHannel), which is an uplink control channel. User data and higher control information are transmitted by this PUSCH. Also, downlink channel state information (CSI (including CQIs and so on)), ACK/NACK and so on are transmitted by the PUCCH.

Figure 17:
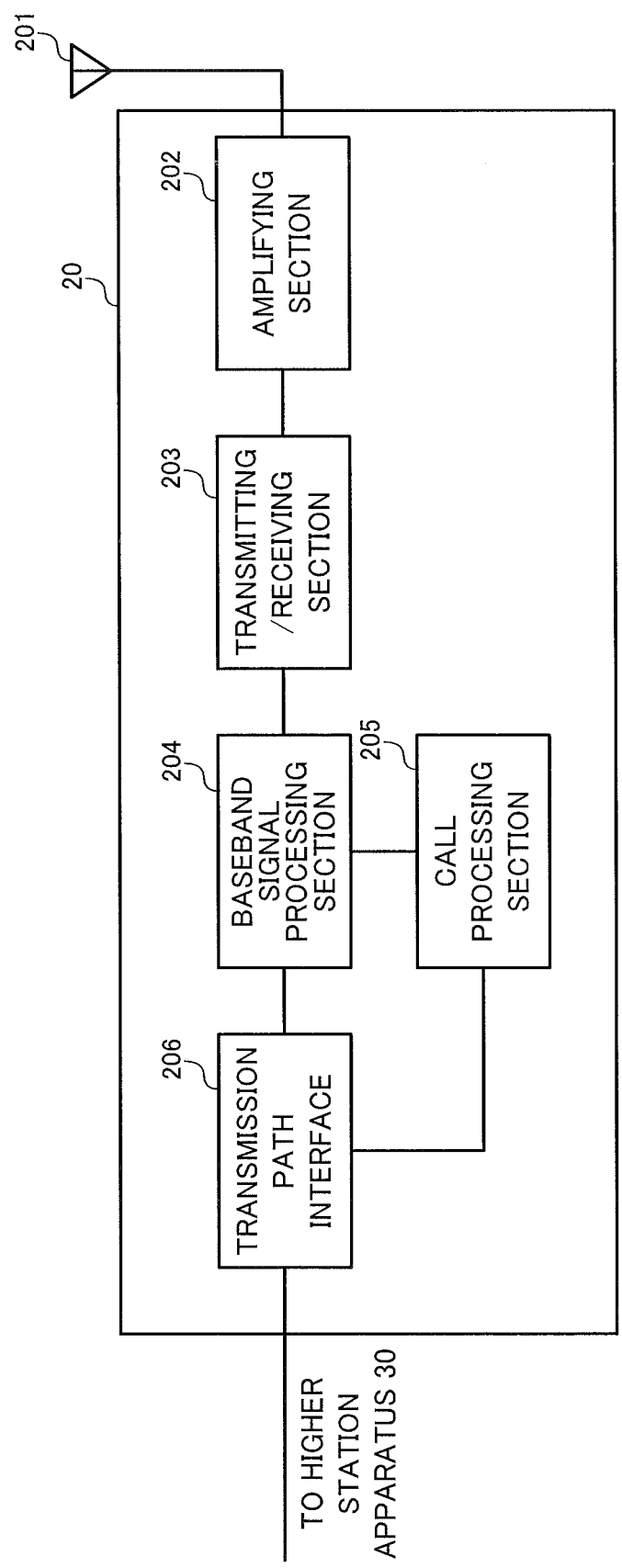
FIG. 17 is a diagram to explain an overall configuration of a radio base station apparatus.

An overall configuration of the base station apparatuses 20 according to the present embodiment will be described with reference to FIG. 17. Note that the base station apparatuses 20A and 20B are configured alike and therefore will be described as "base station apparatus 20." The base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the user terminal 10 on the downlink is input from the higher station apparatus 30, into the baseband signal processing section 204, via the transmission path interface 206.

In the baseband signal processing 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the base station apparatus 20, to the user terminals 10 connected to the same transmission point, through a broadcast channel. The information for allowing communication in that transmission point includes, for example, the uplink or downlink system bandwidth, root sequence identification information (root sequence indices) for generating random access preamble signals in the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal having been subjected to frequency conversion, and outputs the result to the transmitting/receiving antenna 201.

On the other hand, as for signals that are transmitted from the user terminal 10 to the base station apparatus 20 on the uplink, a radio frequency signal that is received in the transmitting/receiving antenna 201 is amplified in the amplifying section 102, converted into a baseband signal through frequency conversion in the transmitting/receiving section 203, and input in the baseband signal processing section 204.

The baseband signal processing section 204 applies an FFT process, an IDFT process, error correction decoding, a MAC retransmission control receiving process, and RLC layer and PDCP layer receiving processes to the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20, and manages the radio resources.

Next, an overall configuration of a user terminal according to the present embodiment will be described with reference to FIG. 18. A user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 100.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 19:
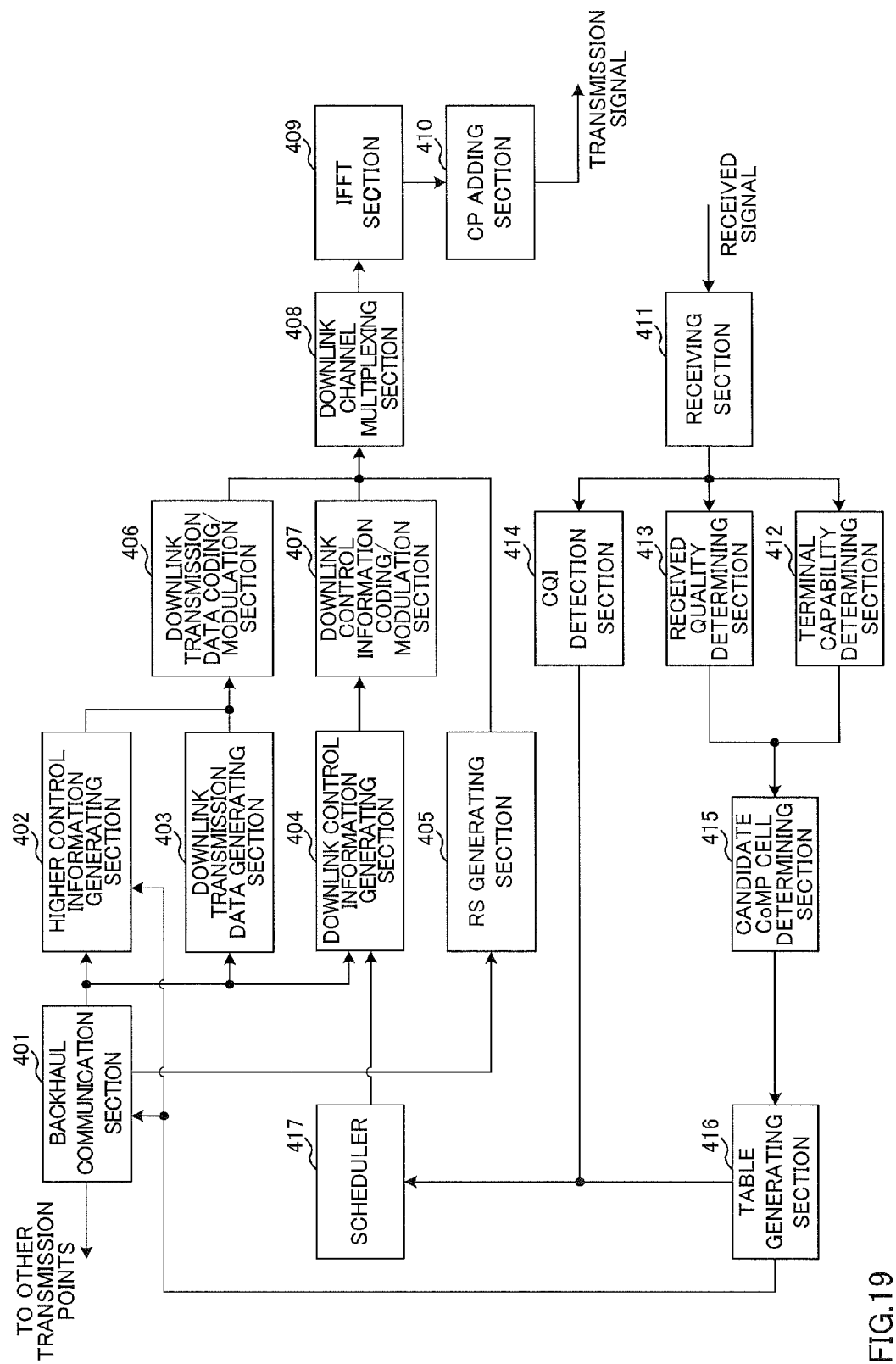
FIG. 19 is a functional block diagram of a radio base station apparatus.

Now, with reference to FIG. 19, functional blocks of a base station apparatus to support CoMP transmission will be described. Note that the functional blocks in FIG. 19 primarily relate to the baseband processing section 204 shown in FIG. 17. Also, although the functional block diagram of FIG. 19 is simplified to explain the present invention, assume that configurations which a baseband processing section 204 should normally have are provided.

The base station apparatus 20 has, on the transmitting side, a backhaul communication section 401, a higher control information generating section 402, a downlink transmission data generating section 403, a downlink control information generating section 404, an RS generating section 405, a downlink transmission data coding/modulation section 406, and a downlink control information coding/modulation section 407. Also, the base station apparatus 20 has a downlink channel multiplexing section 408, an IFFT section 409, and a CP adding section 410. Furthermore, the base station apparatus 20 has a receiving section 411, a terminal capability determining section 412, a received quality determining section 413, a CQI detection section 414, a candidate CoMP cell determining section 415, a table generating section 416, and a scheduler 417.

The backhaul communication section 401 allows communicate with other base stations by means of a backhaul.

The higher control information generating section 402 generates higher control information that is transmitted to the user terminal by higher layer signaling (for example, RRC signaling), and outputs the generated higher control information to the downlink transmission data coding/modulation section 406. For example, the higher control information generating section 402 generates control information including rate matching attributes that are required in the rate matching process when CoMP alone is employed, and generates control information including information such as enhanced cell indices when CoMP and CA are employed.

Also, the higher control information generating section 402 receives a rate matching table that is generated in the table generating section 416, which will be described later. Then, the higher control information generating section 402 generates higher control information that includes this rate matching table, and output this to the downlink transmission data coding/modulation section 406.

The downlink transmission data generating section 403 generates downlink transmission data, and outputs this downlink transmission data to the downlink transmission data coding/modulation section 406. Note that user data as downlink transmission data is supplied from higher layer.

The downlink control information generating section 404 constitutes a generating section, and generates downlink control information (DCI) for controlling the PDSCH using a DCI format having DCI as its content (for example, DCI format 1A and so on).

When CoMP alone is employed, the downlink control information generating section 404 generates DCI, in which rate matching patterns to correspond to CoMP transmission modes are written in the CIFs, based on the registration contents of the rate matching table shown in FIG. 6. Also, when CoMP and CA are employed, the downlink control information generating section 404 generates DCI, in which rate matching patterns to correspond to CoMP transmission modes are written in the CIFs, based on the registration contents of the rate matching table shown in FIG. 15. In this case, information about the CC indices upon CA is also included in the CIFs. At this time, the CIF that is added to the DCI is designated by the scheduler 417 based on the registration contents of the rate matching table generated in the table generating section 416, which will be described later.

The downlink transmission data coding/modulation section 406 performs channel coding and data modulation of the downlink transmission data and the higher control information, and outputs the results to the downlink channel multiplexing section 408. The downlink control information coding/modulation section 407 performs channel coding and data modulation of the downlink control information, and outputs the result to the downlink channel multiplexing section 408.

The RS generating section 405 may generate desired signal measurement RSs and interference measurement RSs, besides generating conventional reference signals (CRS, CSI-RS and DM-RS). These RSs are output to the downlink channel multiplexing section 408.

The downlink channel multiplexing section 408 combines the downlink control information, the reference signals, the higher control information and the downlink transmission data, and generates a transmission signal. The downlink channel multiplexing section 408 outputs the generated transmission signal to the IFFT section 409. The IFFT section 409 applies an inverse fast Fourier transform to the transmission signal and converts the transmission signal from a frequency domain signal into a time domain signal. The transmission signal after the IFFT is output to the CP adding section 410. The CP adding section 410 adds CPs (Cyclic Prefixes) to the transmission signal after the IFFT, and outputs the transmission signal to which CPs have been added, to the amplifying section 202 shown in FIG. 17.

The receiving section 411 receives the transmission signal from the user terminal, and, from this received signal, extracts the terminal capability information (UE capabilities), received quality information, and channel quality information (CQI), and outputs these to the terminal capability determining section 412, the received quality determining section 413, and the CQI detection section 414, respectively.

The terminal capability determining section 412 determines the communication capabilities of the connecting user terminals 10 based on the reported terminal capabilities of the user terminal 10. In particular, the terminal capability determining section 412 determines whether the connecting user terminal 10 is able to support CoMP and CA, based on the reported terminal capabilities. The terminal capability determining section 412 outputs the determined terminal capabilities of the user terminal 10 to the candidate CoMP cell determining section 415.

The received quality determining section 413 determines the received quality (for example, the RSRP) of candidate measurement cells based on the measurement report result. The received quality determining section 413 outputs the determined received quality to the candidate CoMP cell determining section 415.

The CQI detection section 414 determines the received quality on the uplink/downlink. The CQI detection section 414 outputs the determined uplink/downlink received quality to the scheduler 417.

The candidate CoMP cell determining section 415 determines the candidate CoMP cells from the candidate measurement cells based on the terminal capabilities of the user terminal 10 and the received quality of the candidate measurement cells. Note that the candidate CoMP cells include a CoMP set, which represents the combination of independent coordinated cells that serve as transmission points in CoMP transmission (DPS) and multiple cells that serve as transmission points in CoMP joint transmission (JT). The candidate CoMP cell determining section 415 outputs the determined candidate CoMP cells to the table generating section 416.

The table generating section 416 generates a rate matching table based on the candidate CoMP cells. In this case, the table generating section 416 generates the rate matching table shown in FIG. 6 and so on. Then, the generated rate matching table is output to the backhaul communication section 401, the higher control information generating section 402 and the scheduler 417.

The scheduler 417 determines the CoMP transmission cells to transmit the shared data channel (PDSCH) to the user terminal 10, from the candidate CoMP cells, based on CQIs fed back from the user terminal 10. At this time, the scheduler 417 determines the CoMP transmission mode as well. Also, the scheduler 417 determines whether the subframes of the determined CoMP transmission cells are MBSFN subframes or new carrier type subframes. For example, whether or not a subframe is an MBSFN subframe is determined based on the content of another multi-cell/multicast MBSFN entity. Based on the result of this determination and the registration information of the rate matching table, the scheduler 417 selects the rate matching pattern that corresponds to the CoMP transmission mode. Then, the scheduler 417 designates a CIF to represent that rate matching pattern to the downlink control information generating section 404.

In this way, with the base station apparatus 20 according to the present embodiment, a rate matching table, in which rate matching patterns to correspond to CoMP transmission modes are associated with bit information constituting CIFs, is generated in the table generating section 416. For example, the rate matching table that is generated is reported to the user terminal 10 by means of RRC signaling. Then, in the scheduler 417, the CIF that is associated with the rate matching pattern corresponding to the CoMP transmission mode is selected. DCI that includes the CIF that is selected in the downlink control information generating section 404 is generated, and transmitted to the user terminal 10 on the downlink. By this means, it is possible to signal information that is required in rate matching, efficiently, even when CoMP transmission/reception techniques are employed.

Note that a case where the rate matching table 416 is generated prior to scheduling by the scheduler 417 has been described with the functional blocks shown in FIG. 19. However, it is equally possible to generate the rate matching table after scheduling. In this case, the scheduler 417 receives the candidate CoMP cells from the candidate CoMP cell determining section 415. Then, the scheduler 417 carries out scheduling from the candidate CoMP cells and CQIs. Then, the scheduler 417 outputs the scheduling result and so on to the table generating section 416.

In the table generating section 416, a rate matching table is generated based on the scheduling result and so on. In this case, the table generating section 416 generates the rate matching table shown in FIG. 8 and so on.

Then, the rate matching table that is generated is output to the backhaul communication section 401, the higher control information generating section 402 and the scheduler 417. In this case, a rate matching table to reflect the scheduling result can be generated, so that it is possible to reduce the amount of information of the rate matching table. By this means, it is possible to reduce the amount of information to transmit upon reporting the rate matching table to the user terminal 10, and therefore achieve improved system throughput performance.

Figure 20:
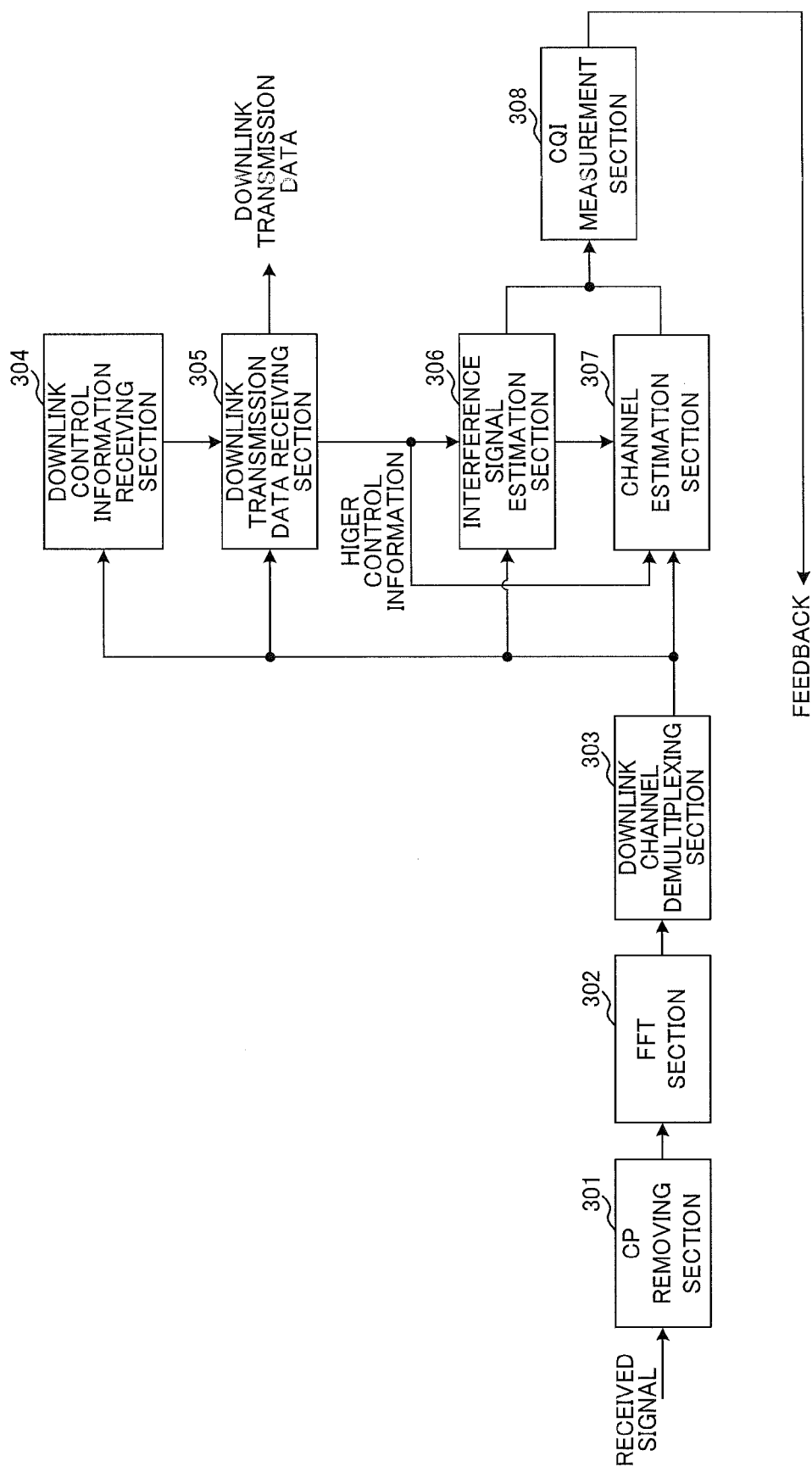
FIG. 20 is a functional block diagram of a user terminal.

Next, with reference to FIG. 20, the functional blocks of the user terminal 10 according to the present embodiment will be described. Note that the functional blocks in FIG. 20 primarily relate to the baseband processing section 104 shown in FIG. 18. Also, although the functional blocks shown in FIG. 20 are simplified to explain the present invention, assume that configurations which a baseband processing section 104 should normally have are provided.

The user terminal 10 has, on the receiving side, a CP removing section 301, an FFT section 302, a downlink channel demultiplexing section 303, a downlink control information receiving section 304, a downlink transmission data receiving section 305, an interference signal estimation section 306, a channel estimation section 307, and a CQI measurement section 308.

Figure 18:
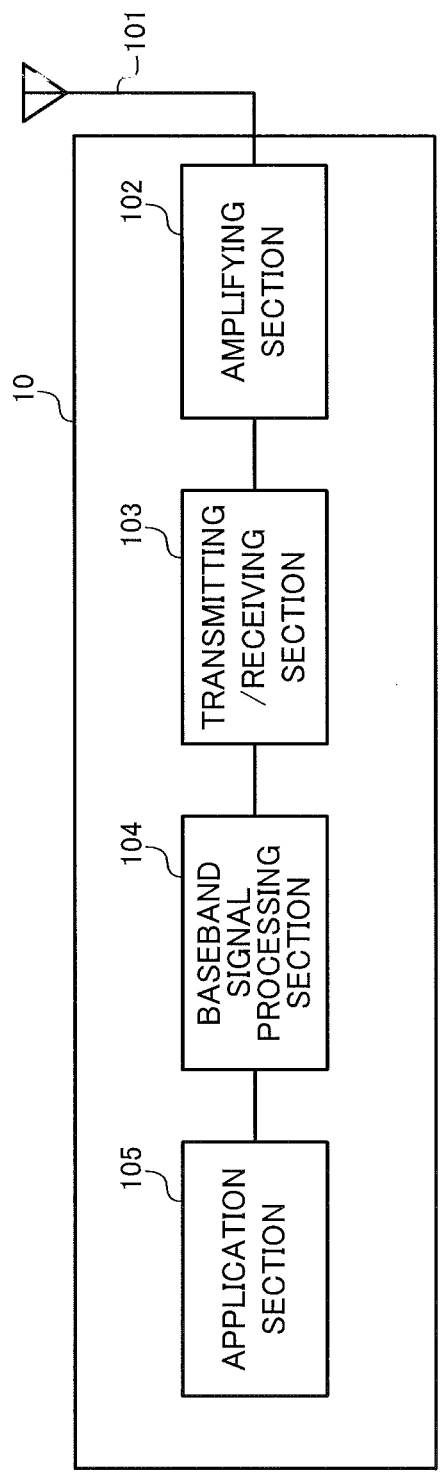
FIG. 18 is a diagram to explain an overall configuration of a user terminal.

A transmission signal that is transmitted from the base station apparatus 20 is received in the transmitting/receiving antenna 101 shown in FIG. 18, and output to the CP removing section 301. The CP removing section 301 removes the CPs from the received signal and outputs the result to the FFT section 302. The FFT section 302 performs a fast Fourier transform (FFT: Fast Fourier Transform) of the signal, from which the CPs have been removed, and converts the time domain signal into a frequency domain signal. The FFT section 302 outputs the signal having been converted into a frequency domain signal to the downlink channel demultiplexing section 303.

The downlink channel demultiplexing section 303 demultiplexes the downlink channel signal into the downlink control information, the downlink transmission data and the reference signals (RSs). The downlink channel demultiplexing section 303 outputs the downlink control information to the downlink control information receiving section 304, outputs the downlink transmission data and higher control information to the downlink transmission data receiving section 305, outputs the interference measurement RS to the interference signal estimation section 306, and outputs the desired signal measurement RS to the channel estimation section 307.

The downlink control information receiving section 304 demodulates the downlink control information (DCI), and outputs the demodulated DCI to the downlink transmission data receiving section 305. The downlink transmission data receiving section 305 demodulates the downlink transmission data using the demodulated DCI. In this case, the downlink control information receiving section 304 functions as a detection section that analyzes the rate matching pattern incorporated in the CIF of the DCI included in the PDCCH received from a specific cell, using the rate matching table, and specifies the rate matching pattern from the bit information of the CIF. Note that the rate matching table is acquired from the higher control information that is included in the downlink transmission data. Also, the downlink transmission data receiving section 305 functions as a rate matching section that carries out rate matching based on the specified rate matching pattern.

Also, the downlink transmission data receiving section 305 outputs the higher control information included in the downlink transmission data to the interference signal estimation section 306. Note that the downlink transmission data receiving section 305 acquires the rate matching table included in the higher control information, and references the rate matching table when executing rate matching.

The interference signal estimation section 306 estimates interference signals using downlink reference signals such as the CRS and CSI-RS. The interference signal estimation section 306 estimates interference signals and finds the average of the measurement results of all resource blocks. The average interference signal estimation result is reported to the CQI measurement section 308.

The channel estimation section 307 specifies the desired signal measurement REs (CSI-RS resources) based on information such as transmission parameters included in the higher control information (or downlink control information), and estimates the desired signal with the desired signal measurement REs.

The channel estimation section 307 reports the channel estimation values to the CQI measurement section 308. The CQI measurement section 308 calculates the channel state (CQI) based on the interference signal estimation result reported from the interference signal estimation section 306 and the channel estimation result reported from the channel estimation section 307. The CQI that is calculated in the CQI measurement section 308 is reported to the base station apparatus 20 as feedback information.

In this way, with the user terminal 10 according to the present embodiment, a rate matching table, in which rate matching patterns corresponding to CoMP transmission modes are associated with bit information constituting CIFs, is received from the base station apparatus 20. Also, the PDCCH, including a CIF formed with bit information corresponding to a rate matching pattern, is received. By this means, the user terminal 10 is able to identify the rate matching information (rate matching pattern) to match the CoMP transmission mode, from the CIF defined in the DCI of the PDCCH. As a result of this, it is possible to signal information that is required in rate matching, efficiently, even when CoMP transmission/reception techniques are employed.

Note that the present invention is by no means limited to the above embodiment and can be carried out with various changes. With the above embodiment, the size, shape and so on shown in the accompanying drawings are by no means limiting, and can be changed as appropriate within the range in which the effect of the present invention is optimized. Besides, the present invention can employ various changes and be implemented without departing the scope of the object of the present invention.

The disclosure of Japanese Patent Application No. 2012-143501, filed on Jun. 26, 2012, including the specification, drawings and abstract, is incorporated herein by reference in its entirety.

The invention claimed is:

1. A radio base station apparatus that applies coordinated multi-point (CoMP) transmission to a user terminal, comprising:

a generating section configured to generate downlink control information including given bit data based on a table in which rate matching patterns are associated with bit data; and a transmission section configured to transmit a physical downlink control channel including the downlink control information and a physical downlink shared channel (PDSCH), wherein the rate matching patterns of the table include a rate matching pattern corresponding to a frame configuration having no resource for allocating the physical downlink control channel and/or a cell-specific reference signal (CRS).

2. The radio base station apparatus according to claim 1, wherein the rate matching patterns include information about a resource element (RE) to which the PDSCH is allocated.

3. The radio base station according to claim 1, wherein the transmission section transmits information of the table to the user terminal by higher layer signaling.

4. A user terminal comprising:

a receiving section that receives a physical downlink control channel and a physical downlink shared channel (PDSCH) from a radio base station apparatus that applies coordinated multi-point (CoMP) transmission;

a detection section that specifies a given rate matching pattern based on specific bit data included in downlink control information that is transmitted using the physical downlink control channel, wherein the detection section specifies the given rate matching pattern by using a table in which rate matching patterns are associated with bit data, and wherein the rate matching patterns of the table include a rate matching pattern corresponding to a frame configuration having no resource for allocating the physical downlink control channel and/or a cell-specific reference signal (CRS).

5. The user terminal according to claim 4, wherein the rate matching patterns include information about a resource element (RE) to which the PDSCH is allocated.

6. The user terminal according to claim 4, wherein the receiving section receives information of the table by higher layer signaling.

7. A radio communication method for a radio base station apparatus that applies coordinated multi-point (CoMP) transmission to a user terminal, generating downlink control information including given bit data based on a table in which rate matching patterns are associated with bit data; and transmitting a physical downlink control channel including the downlink control information and a physical downlink shared channel (PDSCH), wherein the rate matching patterns of the table include a rate matching pattern corresponding to a frame configuration having no resource for allocating the physical downlink control channel and/or a cell-specific reference signal (CRS).

* * * * *